United States Patent
Abdullah et al.

(10) Patent No.: US 10,467,640 B2
(45) Date of Patent: Nov. 5, 2019

(54) COLLECTING AND ANALYZING ELECTRONIC SURVEY RESPONSES INCLUDING USER-COMPOSED TEXT

(71) Applicant: QUALTRICS, LLC, Provo, UT (US)

(72) Inventors: Amirali Abdullah, Provo, UT (US); Martin D. Mumford, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 76 days.

(21) Appl. No.: 15/825,353

(22) Filed: Nov. 29, 2017

(65) Prior Publication Data
US 2019/0164182 A1    May 30, 2019

(51) Int. Cl.
| G06Q 30/02 | (2012.01) |
| G06F 17/27 | (2006.01) |
| G06F 16/21 | (2019.01) |
| G06F 17/18 | (2006.01) |

(52) U.S. Cl.
CPC ....... G06Q 30/0203 (2013.01); G06F 16/212 (2019.01); G06F 17/277 (2013.01); G06F 17/279 (2013.01); G06F 17/2755 (2013.01); G06F 17/2775 (2013.01); G06F 17/2785 (2013.01); *G06F 17/18* (2013.01)

(58) Field of Classification Search
CPC .............. G06F 17/2755; G06F 17/277; G06F 17/2775; G06F 17/2785; G06F 17/279
See application file for complete search history.

(56) References Cited

U.S. PATENT DOCUMENTS

| 10,037,491 | B1* | 7/2018 | Fang | G06N 20/00 |
| 2007/0073533 | A1* | 3/2007 | Thione | G06F 17/279 704/9 |
| 2013/0297545 | A1* | 11/2013 | Bierner | G06F 17/2775 706/46 |
| 2015/0006156 | A1* | 1/2015 | Wang | G06Q 30/00 704/9 |
| 2015/0150023 | A1* | 5/2015 | Johnson | G06F 9/5027 718/107 |
| 2015/0172294 | A1* | 6/2015 | Bittner | G06F 16/00 726/4 |
| 2015/0331850 | A1* | 11/2015 | Ramish | G06F 17/2785 704/9 |
| 2016/0189556 | A1* | 6/2016 | Clark | G06F 17/28 434/362 |
| 2017/0228361 | A1* | 8/2017 | Zhang | G06F 17/2705 |
| 2017/0371885 | A1* | 12/2017 | Aggarwal | G06F 3/0484 |
| 2019/0087408 | A1* | 3/2019 | Komine | G06F 17/2755 |

\* cited by examiner

*Primary Examiner* — Eric Yen
(74) *Attorney, Agent, or Firm* — Keller Jolley Preece

(57) ABSTRACT

Embodiments of the present disclosure relate to collecting and analyzing electronic survey responses that include user-composed text. In particular, systems and methods disclosed herein facilitate collection of electronic survey responses in response to electronic survey questions. The systems and methods disclosed herein classify the electronic survey questions and determine a semantics model including customized operators for analyzing the electronic survey responses to the corresponding electronic survey questions. In addition, the systems and methods disclosed herein provide a presentation of the results of the analysis of the electronic survey responses via a graphical user interface of a client device.

20 Claims, 12 Drawing Sheets

| | | |
|---|---|---|
| Survey Response | "The lightweight tent was surprisingly durable and cheap." | |
| Response Breakdown | Literal | [The] [lightweight] [tent] [was] [surprisingly] [durable] ... |
| | Lemma | [The] [lightweight] [tent] [be] [surprisingly] [durable] ... |
| | Parts Of Speech | [DEF] [ADJ] [NOUN] [VERB] [ADV] [ADJ] [CONJ] [ADJ] |
| 404 — Topic [N] | [Tent] | |
| 406a — Function 1 <Adj> [N] | [Lightweight] [Tent] | |
| 406b — Function 2 <Adj><Adj> [N] | [ ] | |
| 406c — Function 3 [N][Lem:Be] <Adj> | [ ] | |
| 406d — Function 4 [N][Lem:Be] <Adv><Adj> | [Tent] [was] [surprisingly] [durable] | |
| 406e — Function 5 [Fn 3] <Conj><Adj> | [ ] | |
| 406f — Function 6 [Fn 4] <Conj><Adj> | [Tent] [was] [surprisingly] [durable] [and] [cheap] | |

*Fig. 4*

COLLECTING AND ANALYZING ELECTRONIC SURVEY RESPONSES INCLUDING USER-COMPOSED TEXT

BACKGROUND

Companies and other entities often rely on opinions and feedback from customers, employees, or other individuals. A common method of acquiring feedback is through electronic surveys, including electronic customer ratings and reviews (e.g., ratings and reviews for products, services, businesses, etc.). For example, companies often administer electronic surveys to customers to collect meaningful information about the experience of any number of customers with a particular company or product. With the increased convenience and administration of electronic surveys, companies can collect massive amounts of information and data from millions of customers.

Many conventional systems attempt to conserve processing resources by collecting survey responses having an analysis-friendly format. For example, many electronic surveys include questions that solicit rankings, ranges of numbers, defined categories, binary characterizations, or other types of data that facilitate a less robust analysis of the survey results. However, these types of electronic survey questions fail to gather valuable information from respondents as the type of information that respondents provide is predefined. Indeed, if respondents have an issue that is not explicitly identified as a choice within a predefined choice, then that issue is almost impossible to identify from an electronic survey.

Accordingly, most electronic survey administrators place a high value on collecting free-form text responses from respondents that allow a respondent to provide information within the voice of the respondent. As a result of the massive collection of text responses, however, conventional systems for analyzing the text-responses become computationally bogged down and are computer resource intensive (e.g., processor and memory resources) when attempting to identify specific types of information or sift through millions of text responses to survey questions to analyze trends of information within the responses. Indeed, conventional electronic survey systems often cannot provide robust analysis for free-form text responses, or alternatively, consume large amounts of computing resources to perform an analysis, which takes significant computing time. Due to these limitations, conventional systems do not provide tools for determining overall trends or extracting meaningful information from the massive number of free-form text responses.

BRIEF SUMMARY

Embodiments of the present disclosure provide benefits and/or solve one or more of the foregoing or other problems in the art with systems, computer-readable media, and methods for collecting and analyzing electronic survey responses that include user-composed text. In particular, systems and methods disclosed herein facilitate collection of electronic survey responses to electronic survey questions. The systems and methods determine classifications for the electronic survey questions and associated semantics models for analyzing electronic survey responses to the electronic survey questions. In addition, the systems and methods receive a search query requesting information contained within the electronic survey responses. The systems and methods identify survey questions and responses that correspond to the search query and analyze the identified survey responses using an identified semantics model uniquely configured to analyze responses to corresponding survey questions. The systems and methods further provide a presentation of results of the analysis of the survey responses.

Systems and methods described herein involve collecting and analyzing electronic survey responses using features and functionality that identify information within user-composed text responses via an efficient utilization of processing resources. For example, the systems and methods described herein generate, identify, or otherwise determine a semantics model including specific operators associated with identifying certain types of information contained within electronic survey responses. In addition, the systems and methods described herein selectively analyze electronic survey responses more likely to include information requested by a search query. As described in further detail herein, the systems and methods include various features and functionality for identifying specific information contained within electronic survey responses while utilizing fewer processing resources than conventional systems.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIG. 4 illustrates an example operator of a semantic model including exemplary operator functions in accordance with one or more embodiments;

DETAILED DESCRIPTION

Figure 1:
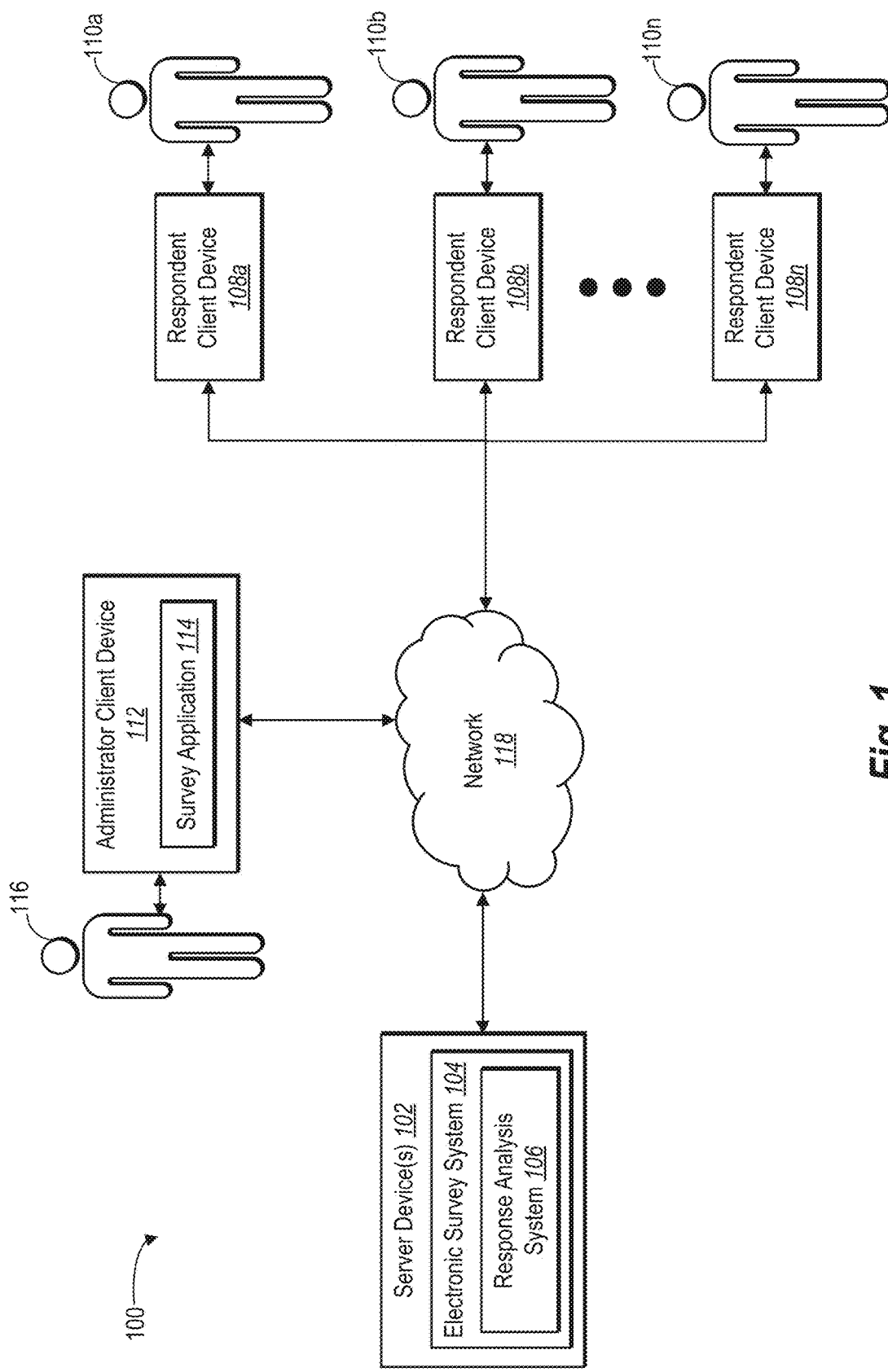
FIG. 1 illustrates a block diagram of a survey analysis environment in accordance with one or more embodiments.

One or more embodiments described herein provide an electronic survey system that enables a user (e.g., an administrative user) to search a collection of electronic survey responses including user-composed text to identify information contained therein. In particular, the electronic survey system receives electronic survey responses corresponding to electronic survey questions. The electronic survey system additionally classifies the electronic survey questions associated with the received electronic survey responses. Based on the classification of the electronic survey questions, the electronic survey system determines a semantics model for analyzing the corresponding electronic survey responses using operators configured to identify specific types of information contained within the electronic survey responses. In particular, the electronic survey system can use the identified semantics model to analyze the user-composed text of the electronic survey responses and provide the results of the analysis to the user.

As a general overview, the electronic survey system can collect electronic survey responses from any number of respondents. In one or more embodiments, electronic survey system administers an electronic survey including electronic survey questions delivered to respondents via associated respondent devices. The electronic survey system can additionally collect electronic survey responses including user-composed text (e.g., free-form, unstructured text responses) and store the electronic survey responses on an electronic survey database.

In addition, before or after administering the electronic survey system, the electronic survey system can classify the electronic survey question(s) of the electronic survey to determine a semantics model to apply to the user-composed text contained within corresponding electronic survey responses. For example, in one or more embodiments, the electronic survey system determines that an electronic survey question includes a request for a respondent to provide a particular type of information (e.g., an opinion, a recommendation, a concern, a criticism, a complaint) within user-composed text. Based on a determined type of information requested by the electronic survey question, the electronic survey system can identify a semantics model configured to analyze user-composed text of the electronic survey responses to the respective electronic survey question and extract or otherwise identify the requested type of information included within the corresponding electronic survey responses.

In one or more embodiments, the electronic survey system further facilitates a search of the electronic survey responses to identify information contained therein. For example, in one or more embodiments, the electronic survey system receives a search query from a client device (e.g., administrator device). In response to receiving the search query, the electronic survey system identifies one or more electronic survey questions having a question classification that corresponds to information requested by the search query and/or a topic identified by the search query. In addition, the electronic survey system identifies those electronic survey responses for the identified one or more electronic survey questions and applies an associated semantics model to the electronic survey responses to identify information requested by the search query. By selecting a semantics model based on a classification for the electronic survey question, the electronic survey system analyzes electronic survey response using a semantics model uniquely suited or otherwise configured to identify the relevant information to the search query.

Upon applying the semantics model to the relevant electronic survey responses, the electronic survey system can further generate and provide a presentation of results of the analysis of the electronic survey responses. For example, the electronic survey system can identify and provide a listing of any number of electronic survey responses that include information identified using the semantics model. As another example, the electronic survey system can extract words, phrases, and other information from the electronic survey responses and provide a visualization of the analysis results via a graphical user interface of a client device. As will be described in further detail below, the electronic survey system further provides various interactive features that enable a user of the client device to modify the presentation and/or modify the semantics model for subsequently analyzing additional electronic survey responses.

As will be described in further detail below, the electronic survey system facilitates an improved approach to analyzing and searching electronic survey responses including user-composed text. As an example, the electronic survey system efficiently analyzes electronic survey responses on a response-by-response basis using a semantics model customized for analyzing electronic survey responses corresponding to specific electronic survey question. In particular, by classifying electronic survey questions that request a specific topic of information (or a specific type of information), the electronic survey system can more efficiently analyze responses to the electronic survey questions by applying a semantics model configured to identify the information requested by the corresponding electronic survey question(s) (and corresponding to the information requested by the search query).

As another example, the electronic survey system more efficiently searches a collection of responses to any number of electronic survey questions. For example, in one or more embodiments, the electronic survey system selectively analyzes electronic survey responses based on a classification of a corresponding electronic survey questions. In this way, rather than analyzing all electronic survey responses that may include a massive collection of user-composed text, the electronic survey system selectively identifies a subset of the electronic survey responses and analyzes those electronic survey responses predicted to include relevant information requested by a search query.

In addition, by identifying and applying semantics models uniquely configured to analyze responses to a specific electronic survey question (or specific type of electronic survey question), the electronic survey system more accurately identifies relevant information contained within the user-composed text of electronic survey responses. In particular, applying a classification-specific semantics model enables the electronic survey system to identify fewer false positives while missing fewer instances of relevant information than conventional methods of searching through electronic survey responses. In addition, as will be described in further detail below, the electronic survey system implements various features and functionality to improve upon the accuracy of semantics models over time for various electronic survey questions. Accordingly, features and functionality of the electronic survey system described herein accurately identify relevant information within electronic survey responses while preserving processing resources of a system. In particular, the electronic survey system results in increases computing efficiency, resulting in a significant reduction in processor and memory resources needed to provide a robust and quality analysis of free-form text responses.

As used herein, an "electronic survey" or "survey" refers to one or more electronic communications or an electronic document used to collect information about associated topics. In one or more embodiments, electronic surveys include electronic survey questions including a request for information from one or more respondents (e.g., person responding to an electronic survey) about a topic. As an example, an electronic survey question can include a request for opinions, suggestions, questions, personal experiences, complaints, or other types of information.

As used herein, an "electronic survey response," "survey response," or "response" refer interchangeably to any digital content received from a respondent in response to an electronic survey question. In one or more embodiments described herein, an electronic survey response includes user-composed text (e.g., free-form text) including words, phrases, and other content composed by a respondent based on a request for information or other open-ended question contained in an electronic survey question.

As used herein, a "semantics model" refers to a model including operators and operator functions for analyzing content of an electronic survey response. In particular, as will be described in further detail below, a semantics model includes operators for identifying particular types of information. For example, a semantics model can include one or more operators configured to identify respondent opinions, recommendations, questions, and other types of information. In addition, as will be described in further detail below, a semantics model can include terminology information, including for example, identified terms and phrases associated with customized meanings within a context of a topic or type of information within a response.

Additional features and characteristics of the electronic survey system are described below with respect to the figures. For example, FIG. 1 illustrates a block diagram of a survey environment 100. In general, and as illustrated in FIG. 1, the survey environment 100 includes a server device(s) 102 including an electronic survey system 104, which includes a response analysis system 106. The survey environment 100 further includes respondent devices 108a-n and associated respondents 110a-n. As further shown, the survey environment 100 includes an administrator device 112 and associated user 116 (e.g., an administrative user). In one or more embodiments, the administrator device 112 further includes a survey application 114 thereon.

As will be described in further detail below, the electronic survey system 104 implements various features and functionality described herein with regard to administering electronic surveys, collecting electronic survey responses, and analyzing electronic survey responses. As shown in FIG. 1, the electronic survey system 104 includes a response analysis system 106 that implements features and functionality described herein with regard to classifying electronic survey questions, processing search queries requesting information contained within the electronic survey questions, and providing a presentation of search results to the user 116 of the administrator device 112. Furthermore, while one or more embodiments described herein refer specifically to the electronic survey system 104 performing features and functionality related to implementing electronic surveys, implementing search features, and providing a presentation of search results, it will be understood that the response analysis system 106 can similarly perform one or more of the features and functionality described herein.

As shown in FIG. 1, the server device(s) 102 can communicate with each of the respondent devices 108a-n and administrator device 112 over the network 118, which may include one or multiple networks and may use one or more communication platforms or technologies suitable for transmitting data between devices. In one or more embodiments, the network 118 includes the Internet or World Wide Web. In addition, or as an alternative, the network 118 can include various other types of networks that use different communication technologies or protocols, as described in further detail below.

Although FIG. 1 illustrates a particular number and arrangement of the respondent devices 108a-n, the survey environment can nonetheless include any number of respondent devices 108a-n. In addition, the respondent devices 108a-n and administrator device 112 can refer to various types of computing devices. For example, one or more of the devices 108a-n, 112 may include a mobile device such as a mobile phone, a smartphone, a PDA, a tablet, or a laptop. Additionally, or alternatively, one or more of the devices 108a-n, 112 may include a non-mobile device such as a desktop computer, a server, or another type of computing device.

As mentioned above, and as shown in FIG. 1, the administrator device 112 includes a survey application 114 shown thereon. In one or more embodiments, the survey application 114 refers to a software application associated with the electronic survey system 104 that facilitates receiving a search query, analyzing electronic survey responses, and providing results of the analysis to the user 116 via a graphical user interface on the administrator device 112. In one or more embodiments, the survey application 114 refers to a native application installed on the administrator device 112. Alternatively, in one or more embodiments, the survey application 114 refers to a web browser that provides access to information shared via a website or web-based application. Additionally, while not shown in FIG. 1, in one or more embodiments, one or more of the respondent devices 108a-n include a survey application thereon to facilitate administration of an electronic survey to the associated respondents 110a-n.

As an overview, the electronic survey system 104 provides an electronic survey to respondents 110a-n via corresponding respondent devices 108a-n. For example, in one or more embodiments, the electronic survey system 104 administers an online electronic survey (e.g., via a web browser) including any number of electronic survey questions requesting information from the respondents 110a-n. The electronic survey questions can include various types of questions including, for example, polls, questionnaires, censuses, or other types of questions requesting information from the respondents 110a-n. In one or more embodiments described herein, the survey questions include requests for electronic survey responses including information contained within user-composed text.

In one or more embodiments, the server device(s) 102 receives and stores electronic survey responses to the administered electronic survey questions. In particular, the respondent devices 108a-n can provide the electronic survey responses to the server device(s) 102. In turn, the server device(s) 102 stores the electronic survey responses to be made available to a user 116 of the administrator device 112 upon request. For example, as will be described in further detail below, the server device(s) 102 can provide electronic survey responses and/or discrete information contained within the electronic survey responses in response to receiving a search query from the administrator device 112.

In one or more embodiments, the electronic survey system 104 classifies the electronic survey questions administered to the respondents 110a-n. For example, the electronic survey system 104 can identify a question classification for an electronic survey question based on attributes of the electronic survey question. For instance, the electronic survey system 104 can classify the electronic survey question based on an identified type of question or a requested type of information solicited by the given electronic survey question. In turn, the electronic survey system 104 associates a semantics model including operators configured to identify discrete types of information contained within corresponding electronic survey responses. Additional detail with regard to associating electronic survey questions with various semantics models will be discussed in further detail below.

As mentioned above, the electronic survey system 104 receives a search query received by the user 116 of the administrator device 112. For example, in one or more embodiments, the user 116 composes a search query including a request for information from a collection of electronic survey responses. In addition, the electronic survey system 104 processes the search query by associating the search query with a question classification and applying an identified semantics model to electronic survey questions associated with the question classification. In this way, the electronic survey system 104 identifies relevant electronic survey responses and searches the electronic survey questions to identify information as requested by the search query. Additional detail with regard to processing a search query and identifying information from the electronic survey responses is discussed in further detail below.

Upon processing the search query and analyzing the electronic survey responses, the electronic survey system 104 generates and provides a presentation of the results of the analysis to the user 116 of the administrator device 112. In particular, in one or more embodiments, the electronic survey system 104 causes the server device(s) 102 to provide a presentation via the administrator device 112 by providing information to the administrator device 112 that facilitates providing a presentation of the analysis results to the user 116 of the administrator device 112. For example, the electronic survey system 104 can cause the server device(s) 102 to provide access to information via the network 118 to be displayed via a graphical user interface of the administrator device 112. As another example, the electronic survey system 104 can cause the server device(s) 102 to provide information to the administrator device 112 to enable the survey application 114 to locally generate a display of the presentation to present a display of the presentation to the user 116. Additional detail with regard to generating and providing the presentation to the user 116 of the administrator device 112 as well as facilitating interactive features in conjunction with the presentation is discussed in further detail below.

Figure 2:
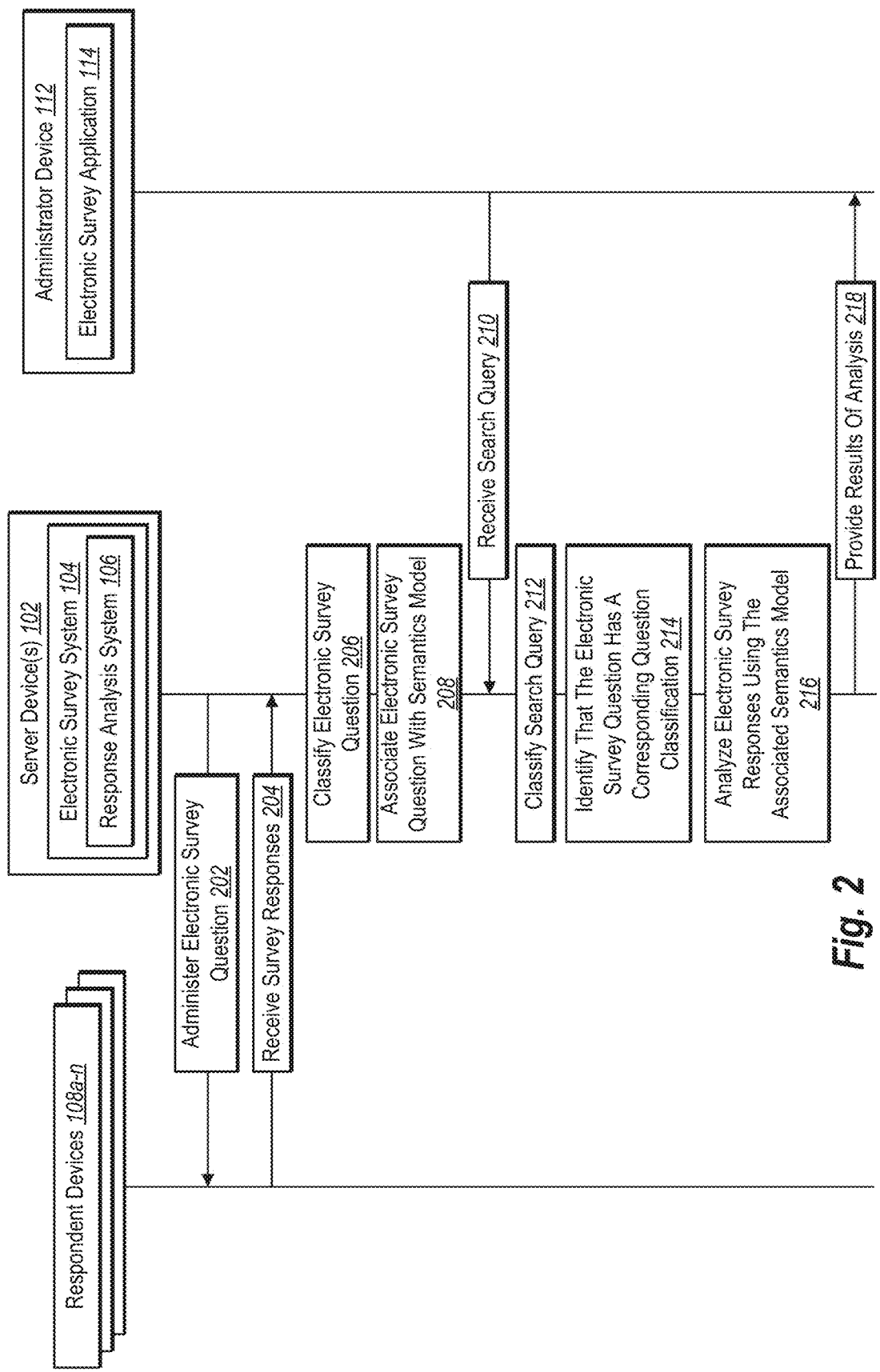
FIG. 2 illustrates a flow diagram of interactions between devices of the survey system to collect and analyze electronic survey responses in accordance with one or more embodiments.

FIG. 2 illustrates a flow diagram representing a process of administering electronic survey questions and analyzing electronic survey responses to the electronic survey questions. In particular, FIG. 2 illustrates a process that involves receiving electronic survey responses including user-composed text and analyzing the user-composed text to identify information contained therein. As shown in FIG. 2, the flow diagram includes respondent devices 108a-n, server device(s) 102 including the electronic survey system 104 and response analysis system 106 thereon, and an administrator device 112 including an electronic survey application 114 thereon.

As illustrated in FIG. 2, the electronic survey system 104 administers 202 an electronic survey question to a plurality of respondent devices 108a-n. In particular, in one or more embodiments, the electronic survey system 104 provides an electronic survey question including a request for information from respondents 110a-n associated with the respondent devices 108a-n. In one or more embodiments, the electronic survey question includes a request for information in a format including user-composed text. The electronic survey question can include a request for different types of information including, for example, opinions, recommendations, questions, and/or positive or negative experiences.

In one or more embodiments, an electronic survey question includes a request for multiple types of information. As an example, an electronic survey question can include a request for both a positive and negative experience. As another example, an electronic survey question can include a request for a complaint and a recommendation. As another example, an electronic survey question includes a request for general comments, which may produce electronic survey responses including various types of information.

In one or more embodiments, the electronic survey system 104 administers the electronic survey question as part of an electronic survey including a plurality of any number of electronic survey questions. In one or more embodiments, the electronic survey system 104 includes questions having different formats. For example, the electronic survey system 104 may administer an electronic survey question including one or more questions that solicit a user-composed response as well as one or more questions including other types of responses (e.g., numerical, binary, categorical). It will be understood that the electronic survey system 104 can administer any number of electronic surveys including any number of electronic survey questions having a variety of different formats.

As further shown in FIG. 2, the server device(s) 102 receives 204 electronic survey responses. In particular, the respondent devices 108a-n provide electronic survey responses including information provided in response to the electronic survey question. In one or more embodiments, the electronic survey responses include user-composed text including opinions, recommendations, questions, and other types of information provided based on the electronic survey question (e.g., based on information requested within the electronic survey question).

As shown in FIG. 2, the electronic survey system 104 classifies 206 the electronic survey questions. In particular, prior to or after administration of an electronic survey, the electronic survey system 104 can generate, identify, or otherwise determine a question classification (or simply "classification") for respective electronic survey questions of the electronic survey. In one or more embodiments, the electronic survey system 104 determines a classification for each electronic survey question based on one or a combination of attributes of each electronic survey question. For example, the electronic survey system 104 can analyze an electronic survey question using one of a variety of analysis techniques (e.g., natural language processing) to identify various attributes of the electronic survey question and determine, based on the identified attributes, a classification for the electronic survey question.

In one or more embodiments, the electronic survey system 104 determines a classification based on a type of the electronic survey question. In particular, the electronic survey system 104 can classify an electronic survey question based on a type of information requested within the electronic survey question. For instance, where the electronic survey system 104 determines that an electronic survey question includes a request for opinions about a product or service, the electronic survey system 104 identifies an "opinions about" classification and associates the electronic survey question with the identified classification.

In one or more embodiments, the electronic survey system 104 determines multiple classifications for an electronic survey question based on a determination that the electronic survey question includes a request for multiple types of information. For example, where an electronic survey question includes a request for both opinions and questions from a respondent, the electronic survey system 104 can determine a classification (or multiple classifications) that encompasses an "opinions of" question-type and a "questions about" question-type. Other combinations of types of information are possible as is understood based on the disclosure herein.

In addition, or as an alternative, in one or more embodiments, the electronic survey system 104 determines a classification based on a topic or subject of the electronic survey question. For example, the electronic survey system 104 can determine that an electronic survey question includes a question about a specific product and classify the electronic survey question based on the specific product. Accordingly, in addition to classifying an electronic survey question based on a type of information requested by an electronic survey question, the electronic survey system 104 can further classify the electronic survey question based on an identified topic or subject of the electronic survey question. In one or more embodiments, the electronic survey system 104 identifies the topic or subject based on an analysis (e.g., natural language analysis) of the electronic survey question.

As further shown in FIG. 2, the electronic survey system 104 associates 208 the electronic survey question with a corresponding semantics model. In particular, in one or more embodiments, the electronic survey system 104 associates an electronic survey question with a semantics model configured to identify information included within electronic survey responses to the electronic survey question. For example, in one or more embodiments, the electronic survey system 104 identifies, generates, or otherwise determines a semantics model configured to identify information included within user-composed text of any number of electronic survey responses. As will be described in further detail below in connection with FIG. 3, a semantics model includes one or more operators and operator functions that the electronic survey system 104 can apply to user-composed text of the electronic survey responses to identify information contained therein. In addition, the electronic survey system 104 can associate any number of electronic survey questions with corresponding semantics models and apply the multiple semantics models to each of the electronic survey responses.

In one or more embodiments, the electronic survey system 104 associates an electronic survey question with a semantics model based on the determined question classification for the electronic survey question. As an example, in one or more embodiments, the electronic survey system 104 identifies a pre-existing semantics model associated with a question classification. In particular, because the pre-existing semantics model includes operators and functions configured to identify a specific type of information requested by the electronic survey question, the electronic survey system 104 associates the pre-existing semantics model with the electronic survey question and subsequently uses the pre-existing semantics model to analyze electronic survey responses received in response to the electronic survey question. For instance, where the electronic survey system 104 classifies an electronic survey question as "opinions of" classification (e.g., an electronic survey question requesting opinions of a product or service), the electronic survey system 104 can identify a pre-existing semantics model including operators configured to identify words or phrases indicative of opinions included within user-composed text of the electronic survey responses.

As an alternative to identifying and associating a pre-existing semantics model with an electronic survey question, in one or more embodiments, the electronic survey system 104 generates a semantics model for the electronic survey question(s). For example, in one or more embodiments, the electronic survey system 104 constructs a semantics model based on the classification and/or attributes of the electronic survey question. In one or more embodiments, the electronic survey system 104 constructs the semantics model by identifying operators and operator functions to include as part of the semantics model. In addition, the electronic survey system 104 can further customize a generated semantics model or a pre-existing semantics model in a variety of ways, as described in further detail below in connection with FIGS. 3-5C.

As further shown in FIG. 2, the server device(s) 102 receive 210 a search query from the administrator device 112. For example, in one or more embodiments, a user 116 of the administrator device 112 composes a search query including a request for information from a plurality of electronic survey responses. Alternatively, in one or more embodiments, the survey application 114 provides an interface via a display of the administrator device 112 including selectable options to enable the user 116 of the administrator device 112. Additional detail with regard to generating a search query is provided below in connection with FIGS. 5A-5C.

As shown in FIG. 2, the electronic survey system 104 classifies 212 the search query. In particular, in one or more embodiments, the electronic survey system 104 determines a query classification for the search query similar to one or more embodiments for determining the question classification for the electronic survey question described herein. For example, the electronic survey system 104 can classify the search query by analyzing the search query and determining a type of information requested by the search query. As an example, where a search query reads "what are customer opinions about our product?," the electronic survey system 104 identifies a query classification for the search query as a "questions about" classification.

In one or more embodiments, the electronic survey system 104 determines multiple query classifications for a search query. For example, the electronic survey system 104 can determine multiple query classifications for the search query based on a determination that the search query includes a request for multiple types of information (e.g., questions and opinions about a topic). As another example, the electronic survey system 104 can determine multiple query classifications for the search query based on a determination that the search query includes a request for information about multiple topics (e.g., opinions about a product and customer service). The electronic survey system 104 can determine any number of query classifications based on determined types of information and topics associated with a search query.

As further shown in FIG. 2, the electronic survey system 104 can further identify 214 that the electronic survey question has a corresponding question classification as the query classification for the search query. In particular, in one or more embodiments, the electronic survey system 104 identifies that the electronic survey question includes a similar request or otherwise corresponds to the search query based on the determined question classification and the query classification. For example, the electronic survey system 104 can determine that the query classification and the question classification correspond based on similar types of information requested by the electronic survey question and the search query. In addition, the electronic survey system 104 can determine that the classifications match based on similar topics of the different classifications.

In one or more embodiments, the electronic survey system 104 identifies multiple electronic survey questions corresponding to the search query. For example, where multiple electronic survey questions request a similar type of information and have similar question classifications, the electronic survey system 104 can determine that a query classification corresponds to each of the similar question classifications for multiple electronic survey questions. Accordingly, the electronic survey system 104 can determine that electronic survey responses to each of the electronic survey questions are likely to include information therein relevant to the search query.

As further shown in FIG. 2, the electronic survey system 104 analyzes 216 electronic survey responses using the associated semantics model. In particular, the electronic survey system 104 analyzes electronic survey responses to the electronic survey question by applying operators and functions of the semantics model to each of the electronic survey responses received in response a corresponding electronic survey question. As mentioned above, the electronic survey system 104 can identify a subset of electronic survey responses for one or more electronic surveys that are likely to include relevant information to the search query based on the question classification(s) for corresponding electronic survey question(s). In addition, in one or more embodiments, the electronic survey system 104 identifies and extracts specific information from the electronic survey responses based on the search query.

In one or more embodiments, the electronic survey system 104 analyzes the electronic survey responses by identifying those electronic survey responses that include the relevant information. For example, in one or more embodiments, the electronic survey system 104 filters the electronic survey responses to generate or otherwise identify a subset of the electronic survey responses that include information requested by the search query and/or electronic survey responses identified by individual operators of the semantics model(s).

In one or more embodiments, the electronic survey system 104 analyzes the electronic survey responses by tagging specific electronic survey responses and/or portions of the electronic survey responses that correspond to the information requested by the search query. For example, where a search query includes a request for opinions about a product, the electronic survey system 104 can tag specific words or phrases (e.g., instances of the product and associated adjectives). In addition, as will be described in further detail below in connection with FIGS. 5A-5C, the electronic survey system 104 can provide a visualization of the tagged words and phrases from the different electronic survey responses in connection with associated topics.

By identifying a semantics model associated with a question classification and identifying electronic survey responses corresponding to the electronic survey question associated with the classification, the electronic survey system 104 analyzes the electronic survey responses using a semantics model uniquely configured to identify information included therein. For example, because the electronic survey system 104 determines a question classification and associated semantics model for analyzing electronic survey responses in response to the received search query, the electronic survey system 104 reduces a number of operations and functions performed on the electronic survey responses to identify relevant information to the search query. In addition, because the semantics model includes operators and functions for identifying specific types of information about specific topics, the electronic survey system 104 additionally identifies information with high precision and high recall while implementing fewer operators and functions to identify electronic survey responses and/or information included therein.

In addition, by identifying question classifications and determining electronic survey questions that correspond to a search query, the electronic survey system 104 reduces the number of electronic survey responses analyzed by analyzing only those electronic survey responses corresponding to electronic survey questions having a specific classification. In this way, the electronic survey system 104 avoids analyzing electronic survey responses unlikely to include information related or otherwise relevant to a given search query. Accordingly, rather than analyzing all electronic survey responses generally, the electronic survey system 104 analyzes only those electronic survey responses likely to include relevant information of a specific type and/or about a specific topic.

As further shown in FIG. 2, the electronic survey system 104 causes the server device(s) to provide 218 the results of the analysis to the administrator device 112. In particular, in one or more embodiments, the electronic survey system 104 provides the results of the analysis via a graphical user interface of the administrator device 112. As mentioned above, in one or more embodiments, the electronic survey system 104 provides a presentation of the results by rendering the results (e.g., providing a visualization of the results) via a remote interface provided by the server device(s) 102. Alternatively, in one or more embodiments, the electronic survey system 104 provides a presentation of the results by providing information to the administrator device 112 and causing the survey application 114 to provide a presentation via a display of the administrator device 112.

Figure 3:
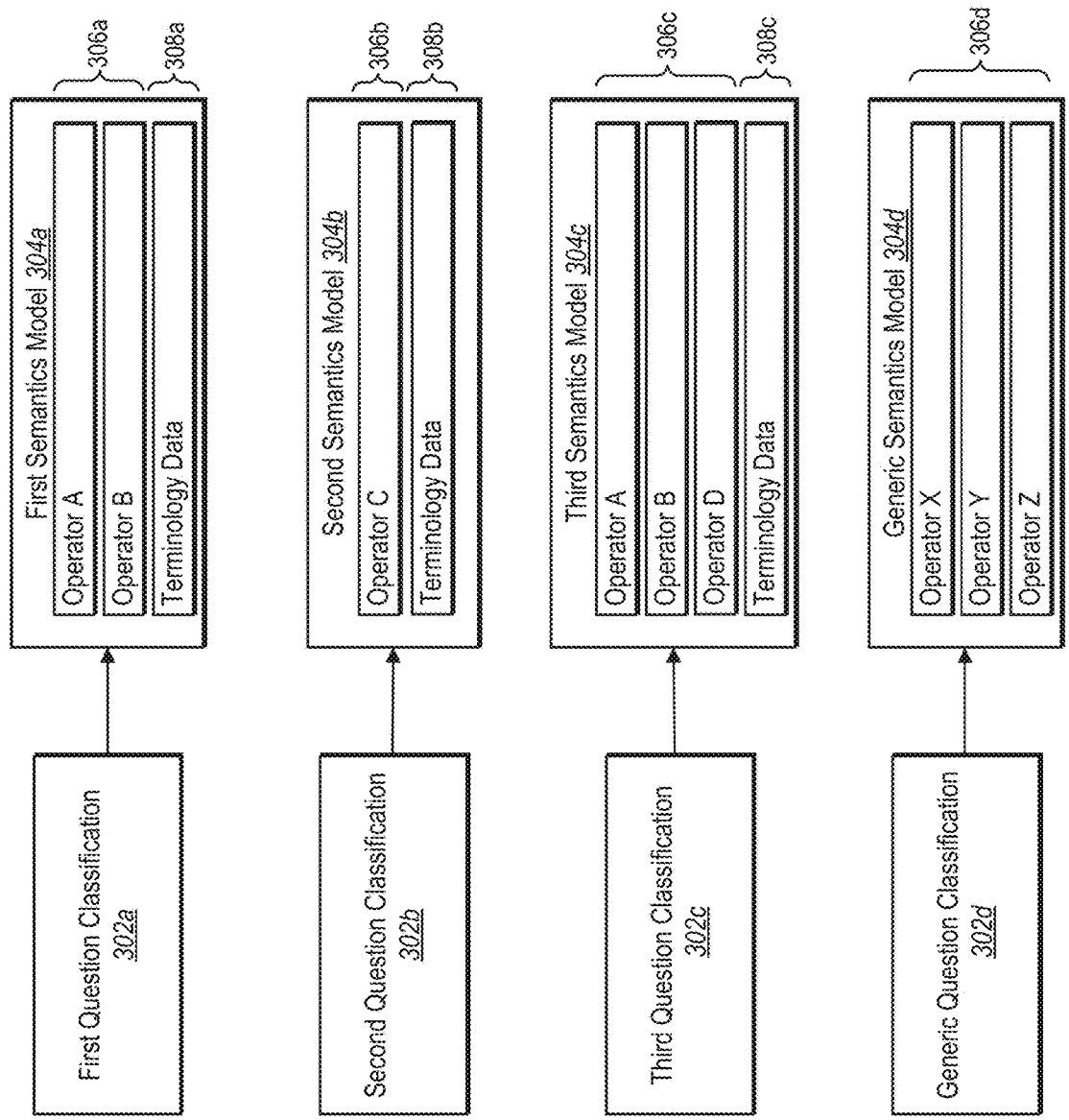
FIG. 3 illustrates example semantic models associated with corresponding question classifications in accordance with one or more embodiments.

Additional detail will now be given with respect to question classifications and associated semantics models. In particular, FIG. 3 includes a block diagram including exemplary question classifications 302*a-d* and associated semantics models 304*a-d*. As shown in FIG. 3, a first question classification 302*a* includes an associated first semantics model 304*a* including operators 306*a* and terminology data 308*a*. As further shown, a second question classification 302*b* includes an associated second semantics model 304*b* including an operator 306*b* and terminology data 308*b*. As further shown, a third question classification 302*c* includes a third associated semantics model 304c including operators 306c and terminology data 308c. In addition, FIG. 3 shows a generic question classification 302d and an associated generic semantics model 304d including operators 306d. Each of the question classifications 302a-d and semantics models 304a-d can include similar features and functionality. Accordingly, one or more features described in connection with a specific question classification or semantics model can similarly apply to the other question classifications and semantics models.

As a first example shown in FIG. 3, the electronic survey system 104 can identify and associate the first question classification 302a with a corresponding electronic survey question. The electronic survey system 104 can subsequently analyze electronic survey responses (e.g., in response to receiving a search query) using the first semantics model 304a. In particular, where the electronic survey system 104 associates an electronic survey question with the first question classification 302a, the electronic survey system 104 can analyze electronic survey responses to the electronic survey question by applying the operators 306a (Operator A and Operator B) to the electronic survey responses to identify discrete information corresponding to the respective operator 306a.

In one or more embodiments, the electronic survey system 104 configures the operators 306a of the first semantics model 304a to identify different types of information. For example, operator A may include one or more operator functions configured to identify opinions about an associated topic. On the other hand, Operator B may include one or more operator functions configured to identify general comments about the associated topic.

In addition, or as an alternative, in one or more embodiments, the electronic survey system 104 configures the operators 306a to identify similar types of information (or different types of information) using different analysis techniques. For example, operator A may include one or more operator functions that identify discrete information from user-composed text using a pattern-matching analysis (e.g., word matching, phrase matching). On the other hand, Operator B may include one or more operator functions that identify discrete information from user-composed text using a dependency parsing technique, contingency matching technique, or other parsing technique for identifying information from user-composed text. Accordingly, some or all of the semantics models 304a-d can include operators that, when applied to electronic survey responses, identify different types of information using different analysis techniques.

In addition to the operators 306a, the electronic survey system 104 can analyze electronic survey responses in view of the terminology data 308a included as part of the first semantics model 304a. In one or more embodiments, the terminology data 308a includes one or more words, phrases, and other terminology information including a specific meaning or significance with respect to a topic or context of the electronic survey question. For example, the terminology data 308a can include specific definitions for words, phrases, or other terminology. In addition, the terminology data 308a can include a significance, sentiment, value, or other metric associated with words, phrases, and other terminology. In this way, the electronic survey system 104 can consider terms of art and/or words that have unconventional meanings when used in relation to an associated topic, or other consideration when identifying information included within electronic survey responses.

As another example shown in FIG. 3, the electronic survey system 104 can determine the second question classification 302b associated with the second semantics model 304b with a corresponding electronic survey question. The electronic survey system 104 can analyze any electronic survey responses received in response to the corresponding electronic survey question by applying the operator 306b (Operator C) to the electronic survey responses in view of the terminology data 308b of the second semantics model 304b. As shown in FIG. 3, the second semantics model 304b can include unique operators 306b and terminology data 308b from the operators 306a and terminology data 308a of the first semantics model 304a.

As another example shown in FIG. 3, the electronic survey system 104 can determine the third question classification 302c associated with the third semantics model 304c with a corresponding electronic survey question. The electronic survey system 104 can analyze any electronic survey responses received in response to the corresponding electronic survey question by applying the operators 306c (Operator A, Operator B, Operator D) to the electronic survey responses in view of the terminology data 308c of the third semantics model 304c. As shown in FIG. 3, the third semantics model 304c includes two similar operators (Operator A, Operator B) to the first semantics model 304a in addition to a unique operator (Operator D) not included within the first semantics model 304a.

In one or more embodiments, the terminology data 308c of the third semantics model 304c can include similar or different data from the terminology data 308a of the first semantics model 304a. For instance, if the electronic survey questions corresponding to the first question classification 302a and third question classification 302c include similar topics, the terminology data 308c of the third semantics model 304c can include similar data as the terminology data 308a of the first semantics model 304a.

As another example shown in FIG. 3, where the electronic survey system 104 fails to identify a question classification (e.g., where a question classification or pre-defined semantics model does not exist for a particular type of question or topic), the electronic survey system 104 can identify or otherwise determine a generic question classification 302d (e.g., a default question classification) corresponding to an electronic survey question and analyze electronic survey responses to the electronic survey question using the generic semantics model 304d including operators 306d (Operator X, Operator Y, Operator Z). In one or more embodiments, the operators 306d of the generic semantics model 304d includes operators for identifying general information commonly included within electronic survey responses. For example, the operators 306d can include multiple operators that use different text analysis techniques for identifying relationship data between topics and generic descriptors. In addition, because the generic semantics model 304d relates generally to a variety of different topics, the generic semantics model 304d may omit or otherwise not include terminology data similar to other semantics models 304a-c associated with specific topics.

As mentioned above, the electronic survey system 104 can associate multiple classifications with an electronic survey question. For example, where an electronic survey question includes a request for multiple types of information, the electronic survey system 104 can associate a single electronic survey question with multiple question classifications, which further associates the electronic survey question with different semantics models. In this case, the electronic survey system 104 can apply each of the semantics models individually. Alternatively, the electronic survey system 104 can generate a new semantics model including each of the operators and a combination of the terminology data. In one or more embodiments, the electronic survey system 104 can apply each of the unique operators once without applying duplicate operators between semantics models. For example, where two semantics models each included Operator A, the electronic survey system 104 would apply Operator A only once between the two semantics models rather than applying Operator A for each separate application of the semantics models.

Additional detail will now be given with respect to an example operator in accordance with one or more embodiments described herein. In particular, FIG. 4 includes a pattern matching operator 402 for analyzing an electronic survey response associated with a given semantics model that includes the example pattern matching operator 402. While FIG. 4 illustrates an example operator configured to identify patterns of words and phrases within an electronic survey response, it will be understood that operators can identify content included within electronic survey responses in a variety of ways.

For example, while FIG. 4 illustrates an example pattern matching operator 402 that identifies patterns of text and phrases within electronic survey responses, in one or more embodiments, the electronic survey system 104 can implement operators that utilize different analysis techniques. Examples of analysis techniques that the electronic survey system 104 can incorporate include distance-based entities-aspect pairs, meronym discriminators to filter out unlikely entities and aspects, term frequency-inverse document frequency (TF-IDF), ranking entities and aspects of text and phrases, pattern-based filters, negation detection, part-of-speech regular expressions (regexes), association-rule mining, C-value measure, information distance and word-similarity, co-reference resolution, double propagation and variants thereof.

In one or more embodiments, the electronic survey system 104 generates or otherwise identifies semantics models including a variety of operators for analyzing user-composed text. For example, the semantics models can include operators that use one or more text analysis techniques described in "Mining and Summarizing Customer Reviews" by Hu and Lu, "Extracting Product Features and Opinions From Reviews" by Popescu and Etzioni, "Opinion Extraction, Summarization, Tracking in News and Blog Corpora" by Ku et al., "Red-Opal: Product Feature Scoring from Reviews," by Scaffidi et al., "An Unsupervised Opinion Miner from Unstructured Product Reviews," by Moghaddam and Ester, "Multi-Aspect Opinion Polling from Textual Reviews," by Zhu et al., "A Review Selection Approach for Accurate Feature Rating Estimation," by Long et al., and "Opinion Mining With Deep Recurrent Neural Networks," by Irsoy et al. Each of these publications are incorporated herein by reference in its entirety. In addition, or as an alternative, the electronic survey system 104 generates or otherwise identifies semantics models including operators for analyzing user-composed text using one or more techniques described in "The Second Workshop on Natural Language Processing for Social Media in conjunction with COLING-2014," which is also incorporated herein by reference in its entirety.

For the sake of explanation, FIG. 4 illustrates an example operator including operator functions in accordance with one or more embodiments. In particular, FIG. 4 illustrates an example pattern matching operator 402 for analyzing an electronic survey response and identifying opinions of a topic therein that utilizes a pattern-matching technique to identify patterns of words to identify one or more opinions stated within a sample electronic survey response. For example, as shown in FIG. 4, the electronic survey response reads "The lightweight tent was surprisingly durable and cheap." As shown in FIG. 4, the electronic survey system 104 initiates the pattern matching operator 402 by breaking down the electronic survey response. In particular, as shown in FIG. 4, the electronic survey system 104 breaks down the electronic survey response word-by-word and performs a lemmatization of the electronic survey response. The electronic survey system 104 further breaks down the lemmatization of the electronic survey response to generate a parts of speech representation of the electronic survey response. Accordingly, as shown in FIG. 4, the electronic survey system 104 breaks down "The lightweight tent was surprisingly durable and cheap" to read as a sequence of parts of speech including "DEF, ADJ, NOUN, VERB, ADV, ADJ, CONJ, ADJ" where DEF refers to a definite article, ADJ refers to an adjective, NOUN refers to a noun, VERB refers to a verb, ADV refers to an adverb, and CONJ refers to a conjunction.

As further shown in FIG. 4, the electronic survey system 104 identifies a topic 404 of the electronic survey response. For example, as shown in FIG. 4, the pattern matching operator 402 includes a topic defined by a noun [N]. Thus, where the electronic survey system 104 identifies a noun of "tent" within the electronic survey response, the electronic survey system 104 determines that the topic 404 of the electronic survey is a tent. In one or more embodiments, the electronic survey system 104 identifies multiple topics. Alternatively, in one or more embodiments, the electronic survey system 104 identifies multiple phrases or sentences within the electronic survey response and identifies one topic per phrase or sentence. Accordingly, in one or more embodiments, the electronic survey system 104 applies an operator to multiple phrases or individual sentences that make up the electronic survey response.

In one or more embodiments, the electronic survey system 104 performs similar steps of breaking down the electronic survey response (e.g., performing the literal breakdown, lemmatization, and parts of speech breakdown). In addition, because many operators (e.g., operators of the same semantics model) include these similar steps, in one or more embodiments, the electronic survey system 104 breaks down the electronic survey response and identifies the topic of the electronic survey response for each of the operators for a given semantics model. Accordingly, where a semantics model includes multiple operators, in one or more embodiments, rather than breaking down the electronic survey response for each operator, the electronic survey system 104 breaks down the electronic survey response, identifies a topic, and/or other preliminary analysis steps and applies the respective operators to the broken-down text of the electronic survey response.

As shown in FIG. 4, the pattern matching operator 402 includes a plurality of operator functions 406a-f for identifying discrete instances of information contained within the electronic survey response. In particular, each of the operator functions 406a-f are configured to identify a corresponding pattern of words (e.g., patterns of parts of speech) within the electronic survey response. As shown in FIG. 4, the electronic survey system 104 applies each of the operator functions 406a-f and determines whether the electronic survey response includes a phrase or pattern of words that correspond to a pattern defined by the respective operator functions 406a-f.

For example, as shown in FIG. 4, the pattern matching operator 402 includes a first operator function 406a defined as "<ADJ>[N]." As shown in FIG. 4, the electronic survey system 104 identifies "lightweight tent" based on the broken down parts of speech matching the pattern identified by the first operator function 406a. Based on this identification, the electronic survey system 104 can further tag or otherwise identify "lightweight" as an opinion of the tent included within the electronic survey response.

The pattern matching operator 402 further includes a second operator function 406b defined as "<ADJ><ADJ><N>," in which the electronic survey system 104 attempts to identify a corresponding pattern within the parts of speech breakdown of the electronic survey response. As shown in FIG. 4, the electronic survey system 104 fails to identify any matches within the parts of speech breakdown for the electronic survey response. As a result, the electronic survey system 104 takes no additional action with respect to the second operator function 406b and continues to apply other operator functions of the pattern matching operator 402.

The pattern matching operator 402 additionally includes a third operator function 406c defined as "[N][Lem:Be]<ADJ>," in which the electronic survey system 104 attempts to identify a corresponding pattern within the parts of speech breakdown and lemma breakdown of the electronic survey response. As shown in FIG. 4, the electronic survey system 104 fails to identify any matches within the parts of speech or lemma breakdowns of the electronic survey response. As a result, the electronic survey system 104 takes no additional action with respect to the third operator function 406c and continues to apply other operator functions of the pattern matching operator 402.

The pattern matching operator 402 further includes a fourth operator function 406d defined as "[N][Lem:Be]<ADV><ADJ>." As shown in FIG. 4, the electronic survey system 104 identifies "tent was surprisingly durable" based on the broken down parts of speech matching the pattern identified by the fourth operator function 406d. Based on this identification, the electronic survey system 104 can tag or otherwise identify "durable" as another opinion included within the electronic survey response.

The pattern matching operator 402 additionally includes a fifth operator function 410e defined as "[Fn 3]<CONJ><ADJ>," which includes the same breakdown of the third operator function 410c as well as a conjunction and adjective. The electronic survey system 104 attempts to identify the corresponding pattern within the parts of speech breakdown and lemma breakdown of the electronic survey response. Because the third operator function 410c included no matches within the electronic survey response, the electronic survey system 104 can skip applying the fifth operator function 410e and return a result indicating that no matches exist within the electronic survey response for the fifth operator function 410e and continue to apply other operator functions of the pattern matching operator 402 to the electronic survey response.

The pattern matching operator 402 additionally includes a sixth operator function 410f defined as "[Fn 4]<CONJ><ADJ>," which includes the same breakdown of the fourth operator function 410d as well as a conjunction and adjective. Similar to the other operator functions, the electronic survey system 104 attempts to identify the corresponding pattern within the parts of speech breakdown and lemma breakdown of the electronic survey response. Because the fourth operator function 410d returned a positive match, the electronic survey system 104 can additionally search for and identify the additional parts of the pattern included within the sixth operator function 410f. In particular, as shown in FIG. 4, the electronic survey system 104 identifies "tent was surprisingly durable and cheap." Based on this identification, the electronic survey system 104 can tag or otherwise identify "cheap" as another instance of an opinion included within the electronic survey response.

It will be understood that while the pattern matching operator 402 only includes six operator functions 410-a-f, operators that make up a corresponding semantics model can include any number of operator functions to identify discrete information included within an electronic survey response. In addition, in one or more embodiments, the electronic survey system 104 adds additional operators and operator functions as well as modifies existing operators and operator functions over time.

For example, in one or more embodiments, the electronic survey system 104 trains a machine learning model that generates a semantics model including operators and operator functions based training data including electronic survey responses and identified opinions included therein. In particular, the electronic survey system 104 can analyze the electronic survey responses and identified opinions to generate one or more semantics models that accurately identify opinions within the electronic survey responses of the training data. The electronic survey system 104 can utilize the semantics model generated by the machine learning process to analyze subsequently received electronic survey responses. As additional information becomes available, the electronic survey system 104 can additionally update the semantics model to include opinions and opinion operators that more accurately identify opinions included within electronic survey responses.

In addition, with respect to identified opinions, experiences, or other information that includes a value of user (e.g., respondent) sentiment (e.g., opinions about a topic), the electronic survey system 104 can further associate a sentiment value with the identified information. For example, the electronic survey system 104 can identify a general positive or negative sentiment for an electronic survey response based on general meanings of identified words and phrases therein. In one or more embodiments, the electronic survey system 104 identifies a positive or negative sentiment for an electronic survey response based on an analysis of the electronic survey response as a whole. For example, where the meaning of a specific word is neutral or unknown, the electronic survey system 104 can nonetheless associate a positive or negative sentiment with the word based on a context in which the word is used. For instance, where a neutral or ambiguous word is used in context with other positive opinions, the electronic survey system 104 may determine that the word has a positive meaning within the context of the electronic survey response.

As an example, in connection with the electronic survey response shown in FIG. 4, while the adjective "cheap" can include either a positive or negative meaning, the electronic survey system 104 may nonetheless associate "cheap" for the example electronic survey response with a positive sentiment based on other positive sentiments expressed within the electronic survey response. Nevertheless, where other electronic survey responses include "cheap" used in connection with negative adjectives (e.g., "the tent was cheap and flimsy"), the electronic survey system 104 may ultimately determine that "cheap" has an overall negative meaning. In one or more embodiments, the electronic survey system 104 may determine that "cheap" has an ambiguous meaning based on mixed or conflicting uses of the term across the electronic survey responses.

In one or more embodiments, the electronic survey system 104 assigns or associates a positive or negative sentiment for a word, phrase, or electronic survey response based on terminology data included within the semantics model. For example, where a word (e.g., an adjective) that describes a topic has a specific meaning different or in contrast to a general meaning when used in connection with the topic, the electronic survey system 104 can include the specific meaning or sentiment within the terminology data for a corresponding semantics model. In one or more embodiments, a user 116 of the administrator device 112 can modify or otherwise re-classify a term for a semantics model, as will be described in further detail in connection with FIGS. 5A-5C.

Figure 5A:
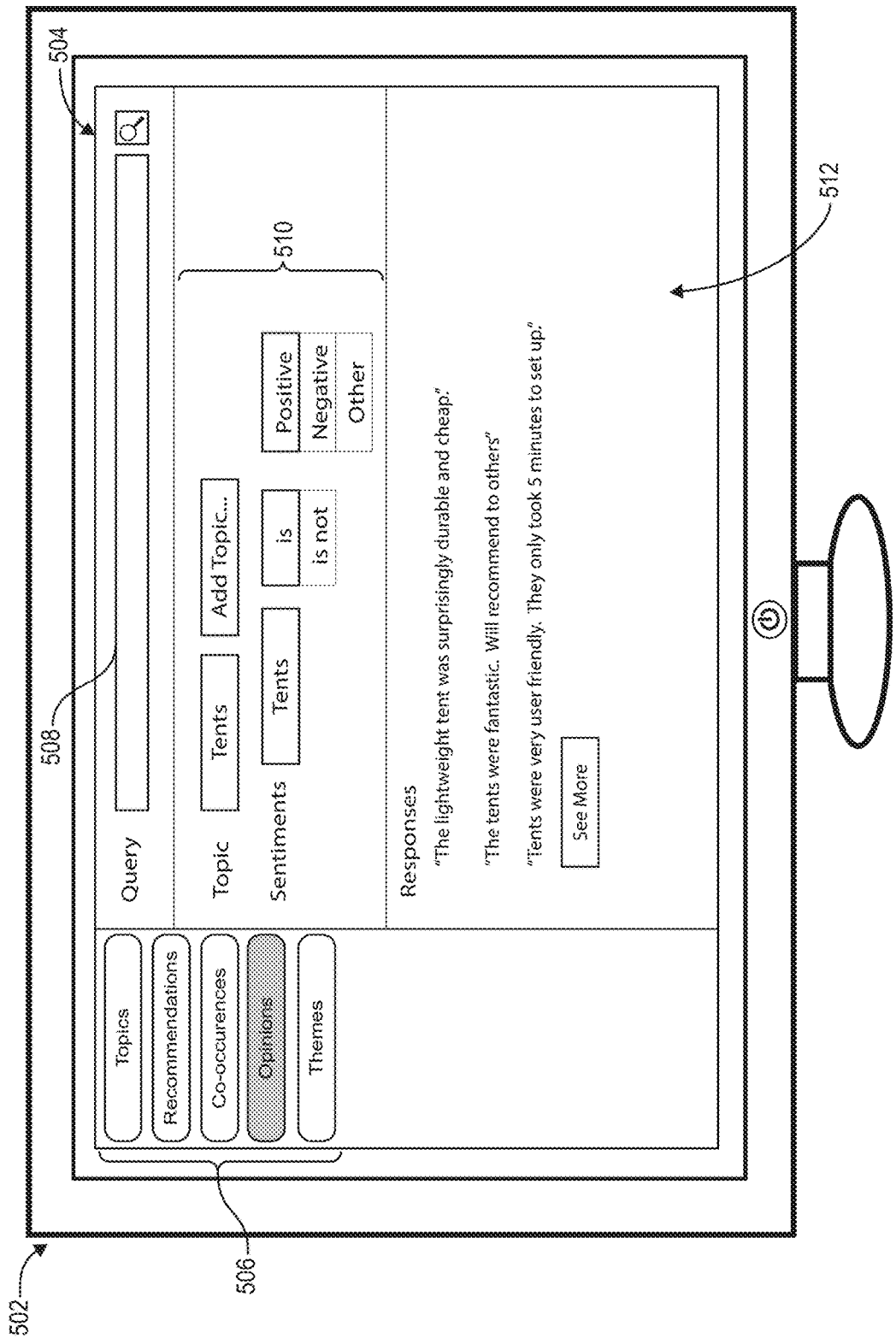
FIGS. 5A-5C illustrate example graphical user interfaces for presenting results of an analysis of electronic survey responses in accordance with one or more embodiments.
Figure 5B:
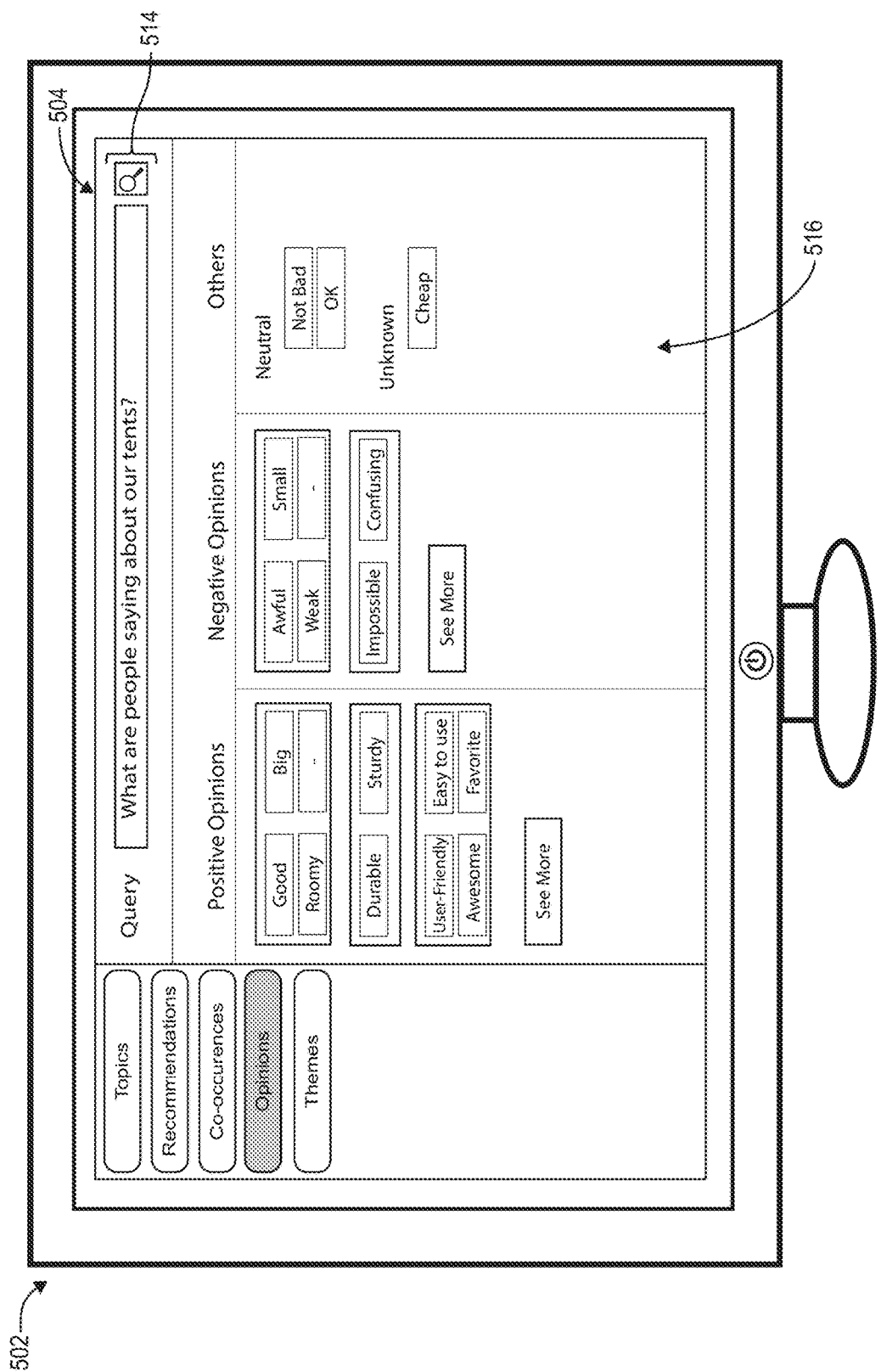
Figure 5C:
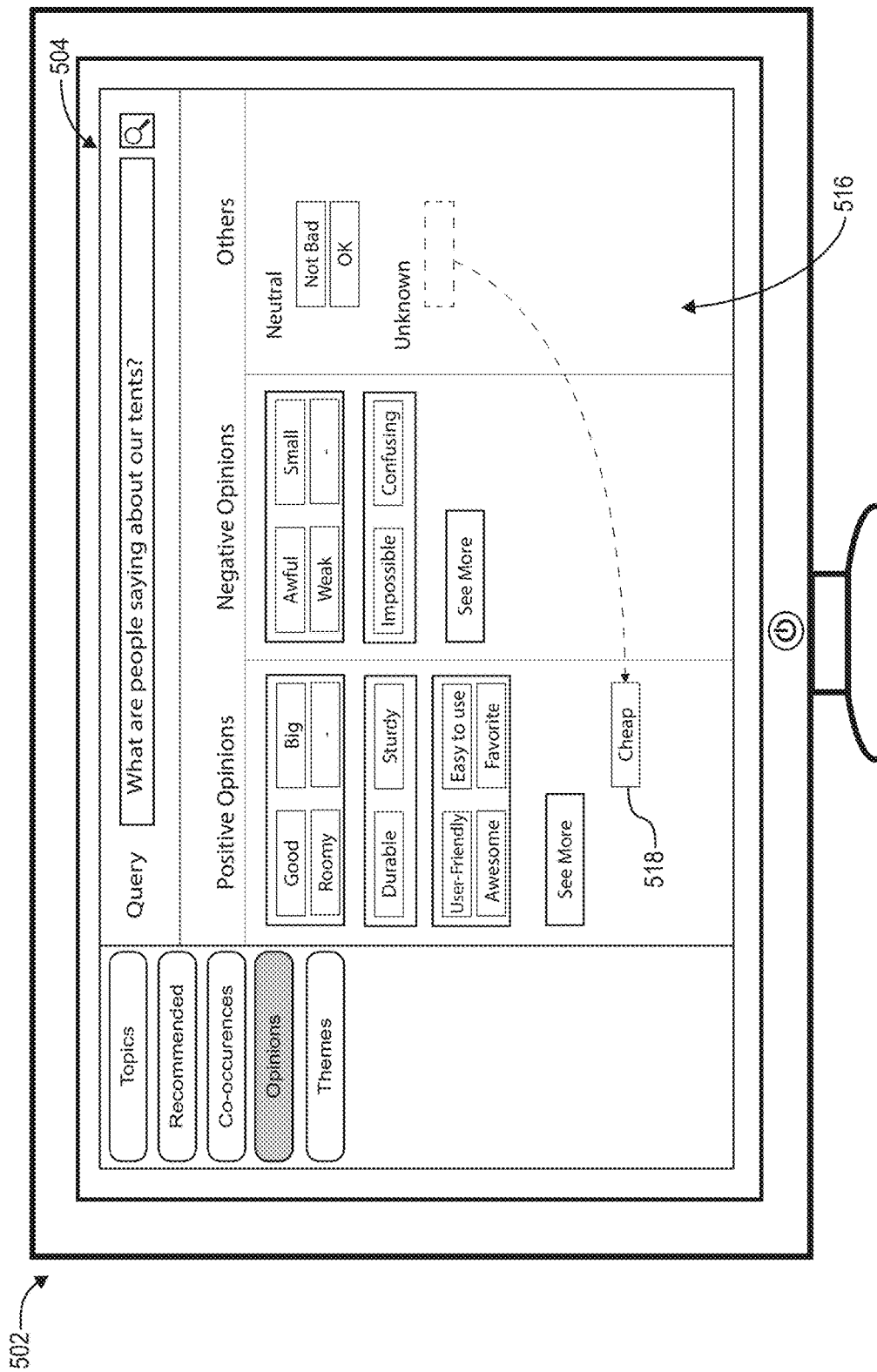

As mentioned above, in addition to analyzing the electronic survey results using operators of one or more semantics models, the electronic survey system 104 can further provide a presentation of the results of the analysis of electronic survey responses to a user 116 of an administrator device 112. For example, in one or more embodiments, the electronic survey system 104 provides the results of the analysis of a collection of electronic survey results via a graphical user interface of the administrator device 112. Additional detail will now be given with respect to an example graphical user interface illustrated on a client device shown in FIGS. 5A-5C. In addition, while one or more embodiments described herein relate to the electronic survey system 104 providing features and characteristics of a presentation of analysis results For example, FIGS. 5A-5C illustrate a client device 502 including a graphical user interface 504 for displaying a presentation of results of an analysis of a plurality of electronic survey responses. In particular, the client device 502 described in connection with FIGS. 5A-5C shows an example administrator device 112 having a survey application 114 thereon in accordance with one or more embodiments. In addition, while FIGS. 5A-5C show a client device 502 including a personal computer device, the electronic survey system 104 can similarly provide a presentation of the results of the analysis of electronic survey responses via a mobile device or other computing device.

As shown in FIG. 5A, the graphical user interface 504 includes a sidebar menu 506 including selectable options. In one or more embodiments, the electronic survey system 104 provides a presentation of selective results of analyzing a collection of electronic survey responses based on a selected option from the sidebar menu 506 of selectable options. For example, the electronic survey system 104 can provide a display of electronic survey results organized by topic, types of responses (e.g., recommendations, co-occurrences, opinions), and various themes. In the example shown in FIG. 5A, the electronic survey system 104 provides a presentation of opinions identified within electronic survey results based on detecting a user selection of the opinions option.

As further shown in FIG. 5A, the graphical user interface 504 includes one or more graphical elements that enable a user of the client device 502 to compose or otherwise identify a search query. For example, the graphical user interface 504 includes a free-form query interface 508 including a space wherein a user of the client device 502 can enter a text query. Similar to one or more embodiments described herein, the electronic survey system 104 can analyze the text query to identify or otherwise determine a query classification. Based on the query classification, the electronic survey system 104 can identify any number of electronic survey questions having a question classification corresponding to the classification of the search query.

In one or more embodiments, and as shown in FIG. 5A, the graphical user interface 504 further includes a search icon query interface 510 including selectable icons that facilitate creation of a search query. In particular, a user of the client device 502 can select icons to identify one or more topics and types of information included within the query. In one or more embodiments, the search icon query interface 510 includes different selectable options based on the selected option of the sidebar menu 506. Accordingly, because the opinions option has been selected, the electronic survey system 104 provides selectable icons for generating a search query for identifying opinions of respondents included within a collection of electronic survey responses.

As further shown in FIG. 5A, the graphical user interface 504 includes a display of identified responses 512 that include information corresponding to the search query. For example, as shown in FIG. 5A, the search query includes an identification of a topic of "tents" and a request for positive opinions about the tents. In response to receiving this search query, the electronic survey system 104 identifies electronic survey results including an identified topic of tents and identified positive opinions. In accordance with one or more embodiments described herein, the electronic survey system 104 identifies the electronic survey results based on applying a semantics model to electronic survey results associated with electronic survey questions including a request for opinions related to the tent (e.g., based on a question classification for the electronic survey question(s)). In particular, the display of identified responses 512 includes those electronic survey responses including a mention of a tent or tent in addition to one or more adjectives associated with the tent or tents.

FIG. 5B illustrates an example presentation including a display of results of performing an analysis of electronic survey responses based on a received search query. In particular, as shown in FIG. 5B, the graphical user interface 504 includes a text-based search query 514 including user-composed text and a visualization 516 of identified terms from within electronic survey results corresponding to the search query.

For example, in response to receiving the search query "What are people saying about our tents?," the electronic survey system 104 can determine a query classification or otherwise classify the search query as a "questions about" search query having a topic of "tents." In addition, the electronic survey system 104 can identify one or more electronic survey questions having a similar question classification (e.g., opinions about tents or other products associated with a respective merchant or industry). The electronic survey system 104 can further analyze electronic survey results corresponding to the identified one or more electronic search questions and track words or phrases associated with opinions about tents using one or more semantics models associated with the identified electronic survey questions having one or more question classification (s) associated with the query classification.

As shown in FIG. 5B, the electronic survey system 104 provides a visualization 516 of the identified opinions about the tents. In particular, the visualization 516 includes instances of positive opinions including words identified within electronic survey responses like good, big, roomy, durable, sturdy, user-friendly, easy to use, awesome, and favorite. The visualization 516 additionally includes instances of negative opinions including words and phrases identified within electronic survey responses like awful, small, weak, impossible, and confusing. In one or more embodiments, the electronic survey system 104 provides identified words and phrases having a threshold number of instances that appear within the electronic survey responses. As another example, the electronic survey system 104 can provide identified words and phrases that appear most often in the respective categories.

In one or more embodiments, the electronic survey system 104 can select an option to "see more" positive or negative opinions. For example, where the electronic survey system 104 only provides a portion of the identified words and phrases identified a threshold number of times, the electronic survey system 104 can provide other words or phrases that express positive or negative opinions that appear fewer than the threshold number of times. In one or more embodiments, the electronic survey system 104 facilitates switching between the visualization shown in FIG. 5B and the listing electronic survey results shown in FIG. 5A. Alternatively, in one or more embodiments, the electronic survey system 104 provides both the visualization 516 and a listing of identified one or more electronic survey results within the graphical user interface 504.

In some embodiments, the words and phrases shown within the visualization 516 include selectable icons that enable a user of the client device 502 to view specific electronic survey responses including specific words or phrases. For example, in response to detecting a user selection of "awful" under the negative opinions category, the electronic survey system 104 can provide a listing of electronic survey results including instances of the word "awful" used in connection with the tents within relevant electronic survey responses.

As further shown in FIG. 5B, the visualization 516 of the analysis results includes neutral and/or unknown terms. For example, the visualization 516 includes neutral words and phrases like "not bad" and "OK." In addition, the visualization 516 includes unknown words like "cheap." In one or more embodiments, the electronic survey system 104 categorizes the identified words and phrases based on conventional meanings of the terms. Alternatively, in one or more embodiments, the electronic survey system 104 categorizes the identified words and phrases based on terminology data included within semantics models used to analyze the electronic survey responses. For example, where "big" or "small" could be good or bad depending on the topic, the electronic survey system 104 can determine that "big" is positive and that "small" is negative based on terminology data of a semantics model including assigned sentiment to various terms.

As mentioned above, in one or more embodiments, the electronic survey system 104 determines a sentiment associated with one or more words or phrases based on an analysis of the electronic survey responses in which the words or phrases appear. For example, where a particular descriptor (e.g., word or phrase) appears in connection with other positive terms, the electronic survey system 104 can associate the descriptor with a positive sentiment. In addition, where a descriptor appears in connection with both negative and positive terms, the electronic survey system 104 can categorize the descriptor as unknown or ambiguous. For example, where the word "cheap" may appear both in connection with positive and negative terms, the electronic survey system 104 can assign "cheap" to an unknown category.

In one or more embodiments, the electronic survey system 104 enables a user of the client device 502 to re-categorize or manually assign a word or phrase to a category. For example, FIG. 5C shows a "cheap" word icon 518 re-assigned from the unknown category to the positive opinions category. In particular, the electronic survey system 104 changes the word "cheap" from the unknown category to the positive opinion category based on detecting a user selection of the word icon 518 and movement of the word icon 518 from the unknown category to the positive opinion category.

In one or more embodiments, the electronic survey system 104 modifies a semantics model based on the user input moving a word or phrase from one category to another category. For example, in response to detecting placement of the icon 518 from the unknown category to the positive opinions category, the electronic survey system 104 can modify terminology data for a semantics model used to analyze the electronic survey responses including the information shown within the visualization 516 of the survey results analysis.

In addition, as mentioned above, in one or more embodiments, the electronic survey system 104 provides a listing of one or more electronic survey results including the words or phrases identified therein. In one or more embodiments, the electronic survey system 104 enables a user of the client device 502 to select one or more words or phrases where particular words or phrases were missed in analyzing the electronic survey results. In one or more embodiments, the electronic survey system 104 further modifies a semantics model based on an identification of one or more words or phrases within an electronic survey response. For example, the electronic survey system 104 can add or modify one or more operator functions to avoid future instances of missing relevant words or phrases. Accordingly, the electronic survey system 104 can modify semantics models, operators, or individual operator functions over time and based on received user input to improve upon the accuracy of identifying information contained within electronic survey responses.

Figure 6:
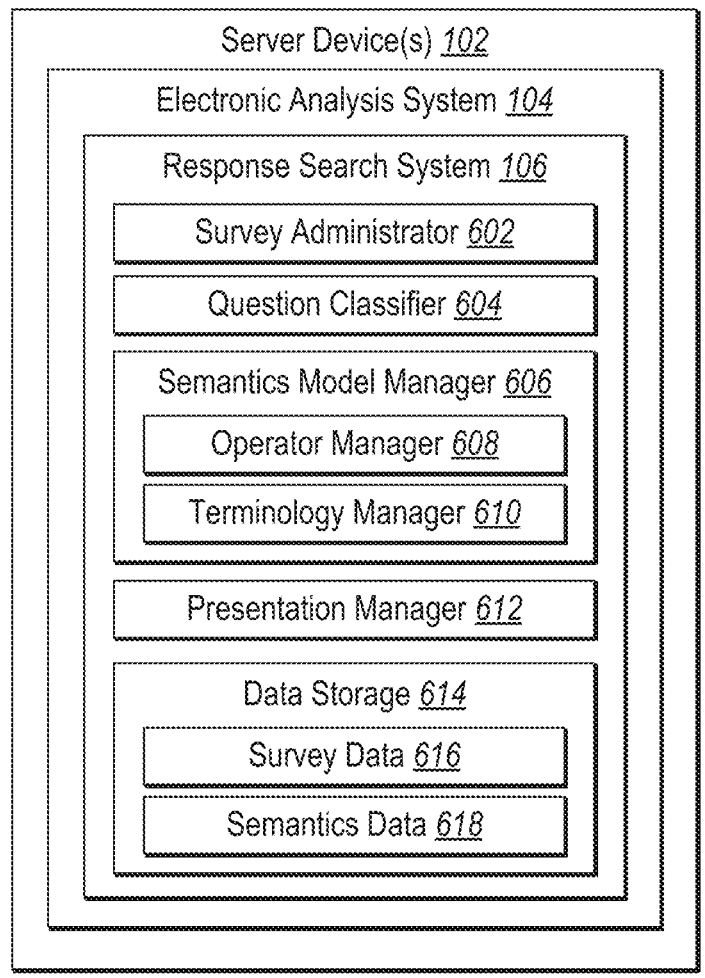
FIG. 6 illustrates a schematic diagram of a server device upon which an electronic survey system is implemented in accordance with one or more embodiments.

FIG. 6 illustrates a schematic diagram of an example embodiment of the server device(s) 102 including the electronic survey system 104 and the response system 106 described above in connection with FIGS. 1-5C. As further shown in FIG. 6, the response analysis system 106 includes a survey administrator 602, question classifier 604, semantics model manager 606, which includes an operator manager 608 and a terminology manager 610, and a presentation manager 612. The response analysis system 106 further includes a data storage 614 including survey data 616 and semantics data 618. Although FIG. 6 illustrates the components 104-106 and 602-614 to be separate, any of the components 104-106 or 602-614 may be combined into fewer components, such as into a single facility or module or divided into more components as may be suitable for one or more embodiments. In addition, the components 104-106 or 602-614 may be located on or implemented by one or more computing devices, such as those described below.

In addition, components 104-106 and 602-614 can comprise software or hardware or a combination of software and hardware. For example, the components 104-106 and 602-614 can comprise one or more instructions stored on a non-transitory computer readable storage medium that are executable by a processor of one or more computing devices. When executed by the one or more processors, the computer-executable instructions of the electronic survey system 104 cause computing device(s) to perform the methods described herein. Alternatively, the components 104-106 and 602-614 can comprise a special-purpose processing device to perform a certain function. Additionally or alternatively, the components 104-106 and 602-614 can comprise a combination of computer-executable instructions and hardware.

As mentioned above, the response analysis system 106 includes a survey administrator 602. The survey administrator 602 collects or otherwise receives electronic survey information from respondents 110*a-n* of one or more electronic surveys. For example, in one or more embodiments, the survey administrator 602 administers an electronic survey by providing electronic survey questions to respondent devices 108*a-n*. In one or more embodiments, the survey administrator 602 receives and stores electronic survey responses received from the respondent devices 108*a-n* in response to the electronic survey questions. As discussed above, the survey administrator 602 receive any number of electronic survey responses to any number of electronic survey questions. In addition, the survey administrator 602 can receive electronic survey responses including user-composed text that includes information composed by respondents 110*a-n* of the respondent devices 108*a-n*.

As shown in FIG. 6, the response analysis system 106 further includes a question classifier 604. The question classifier 604 classifies one or more electronic survey questions based on a variety of attributes of the electronic survey question(s). For example, the question classifier 604 can classify an electronic survey question as a question-type referring to a type of information requested by the electronic survey question. In addition, or as an alternative, the question classifier 604 can classify the electronic survey question based on a topic (or multiple topics) of the electronic survey question.

As further shown in FIG. 6, the response analysis system 106 includes a semantics model manager 606. In one or more embodiments, the semantics model manager 606 determines, identifies, or otherwise associates the identified question classification with a corresponding semantics model for analyzing electronic survey responses received in response to the electronic survey question associated with the question classification. In particular, the semantics model manager 606 determines a semantics model to use for analyzing any electronic survey responses received in response to one or more electronic survey questions associated with the question classification. In one or more embodiments, the semantics model manager 606 identifies a semantics model for analyzing a subset of a collection of electronic survey responses (e.g., a collection of electronic survey responses corresponding to all electronic survey responses of an electronic survey).

As shown in FIG. 6, the semantics model manager 606 includes an operation manager 608. As mentioned above, a semantics model includes one or more operators for identifying discrete information contained within electronic survey responses. In one or more embodiments, the operation manager 608 generates or otherwise identifies operators to include within a semantics model. For example, the operation manager 608 can selectively identify operators including operator functions to identify specific patterns, dependencies, or other content of the electronic survey responses to identify information included within user-composed text of the electronic survey responses.

In one or more embodiments, the operation manager 608 trains or modifies the operators and/or operator functions of a semantics mode. For example, in one or more embodiments, the operation manager 608 receives a set of training data including electronic survey responses in which information has been identified. The operation manager 608 trains the semantics model by generating or selecting operators and operator functions configured to identify information within the electronic survey questions with a threshold accuracy (e.g., a threshold recall rate and/or a threshold precision rate). In one or more embodiments, as additional information comes available, the operation manager 608 can refine the semantics model by adding or modifying operators therein to improve upon the rate of recall and precision in identifying information contained within subsequently received electronic survey responses.

As described in one or more embodiments herein, operation manager 608 identifies and implements operators including patterns, dependencies, etc. to identify discrete information within user-composed text of electronic survey responses. In addition, or as an alternative, in one or more embodiments, operation manager 608 trains or otherwise implements a semantics model that identifies neural opinion operators that use bi-directional long-term short memory (LTSM) with an attention mechanism to extract or otherwise identify opinion-subject pairs from arbitrary text. In one or more embodiments, operation manager 608 can utilize other neural network architectures with labeled data (e.g., LTSM) to learn patterns not explicitly specified, but can be inferred from labeled examples.

In addition to the operation manager 608, the semantics model manager 606 further includes a terminology manager 610. In one or more embodiments, the terminology manager 610 identifies words and phrases associated with various topics and generates terminology data for corresponding topics and semantics models. In addition, the terminology manager 610 can associate meanings with words and phrases for use in identifying information included within electronic survey responses. For example, when identifying positive and/or negative opinions about a topic, the terminology manager 610 can identify specific meanings or sentiment associated with different words or phrases in context with the topic that have a different meaning or sentiment when used in other contexts. In one or more embodiments, the terminology manager 610 maintains terminology data for each respective semantics model and/or for each topic of multiple topics.

As further shown in FIG. 6, the response analysis system 106 includes a presentation manager 612. In one or more embodiments, the presentation manager 612 generates and provides a presentation of results of an analysis of electronic survey responses to be displayed via a graphical user interface of an administrator device 112. In one or more embodiments, the presentation manager 612 provides the presentation via a web interface or other interface provided via a remote source to the administrator device 112. Alternatively, in one or more embodiments, the presentation manager 612 provides data to the administrative device 112 which enables a survey application 114 to generate and display the presentation via a graphical user interface on the administrative device 112.

Similar to one or more embodiments described herein, the presentation manager 612 further provides interactive features that enable a user 116 of an administrator device 112 to view different information associated with electronic survey responses. For example, the presentation manager 612 can provide a query interface that enables a user to enter a search query or select various options for generating a search query. In addition, the presentation manager 612 provides selectable options that enable the user 116 to view specific responses that include discrete information. Further, the presentation manager 612 provides selectable options that facilitates re-categorization of various words or phrases (e.g., re-assigning meaning or sentiment to particular words or phrases for a topic). In one or more embodiments, the presentation manager 612 facilitates modification of one or more semantics models based on received input with respect to a presentation of results of analyzing the electronic survey responses.

As further shown in FIG. 6, the electronic survey system 104 includes a data storage 614 including survey data 616. In one or more embodiments, the survey data 616 includes any data associated with one or more electronic surveys administered by the electronic survey system 104. For example, the survey data 616 can include information associated with electronic survey questions as well as information included within electronic survey responses.

In addition, the data storage 614 includes semantics data 618. The semantics data 618 includes any information associated with semantics models used for analyzing electronic survey results. For example, the semantics data 618 can include stored associations between question classifications and respective semantics models. In addition, the semantics data 618 can include information associated with any number of operators as well as individual operator functions that make up the various operators.

FIGS. 1-6, the corresponding text, and example, provide a number of different systems and devices that facilitate analyzing electronic survey responses and providing a presentation of the analysis results. In addition to the foregoing, embodiments can also be described in terms of flowcharts including acts and steps in a method for accomplishing a particular result. For example, FIGS. 7-8 illustrate flowcharts of exemplary methods and acts in accordance with one or more embodiments.

Figure 7:
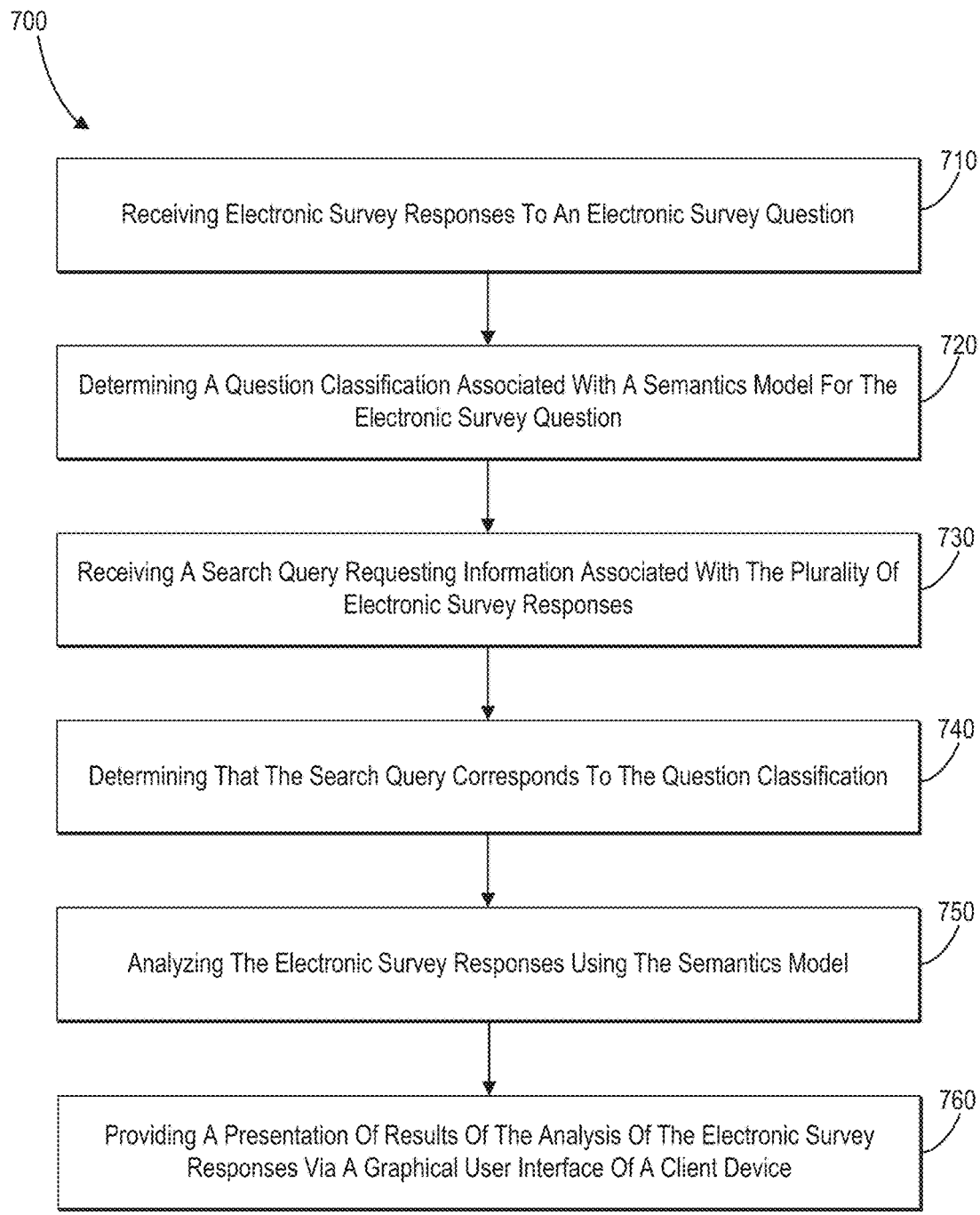
FIG. 7 illustrates a flowchart of a series of acts in a method for collecting and analyzing electronic survey responses to an electronic survey question in accordance with one or more embodiments.
Figure 8:
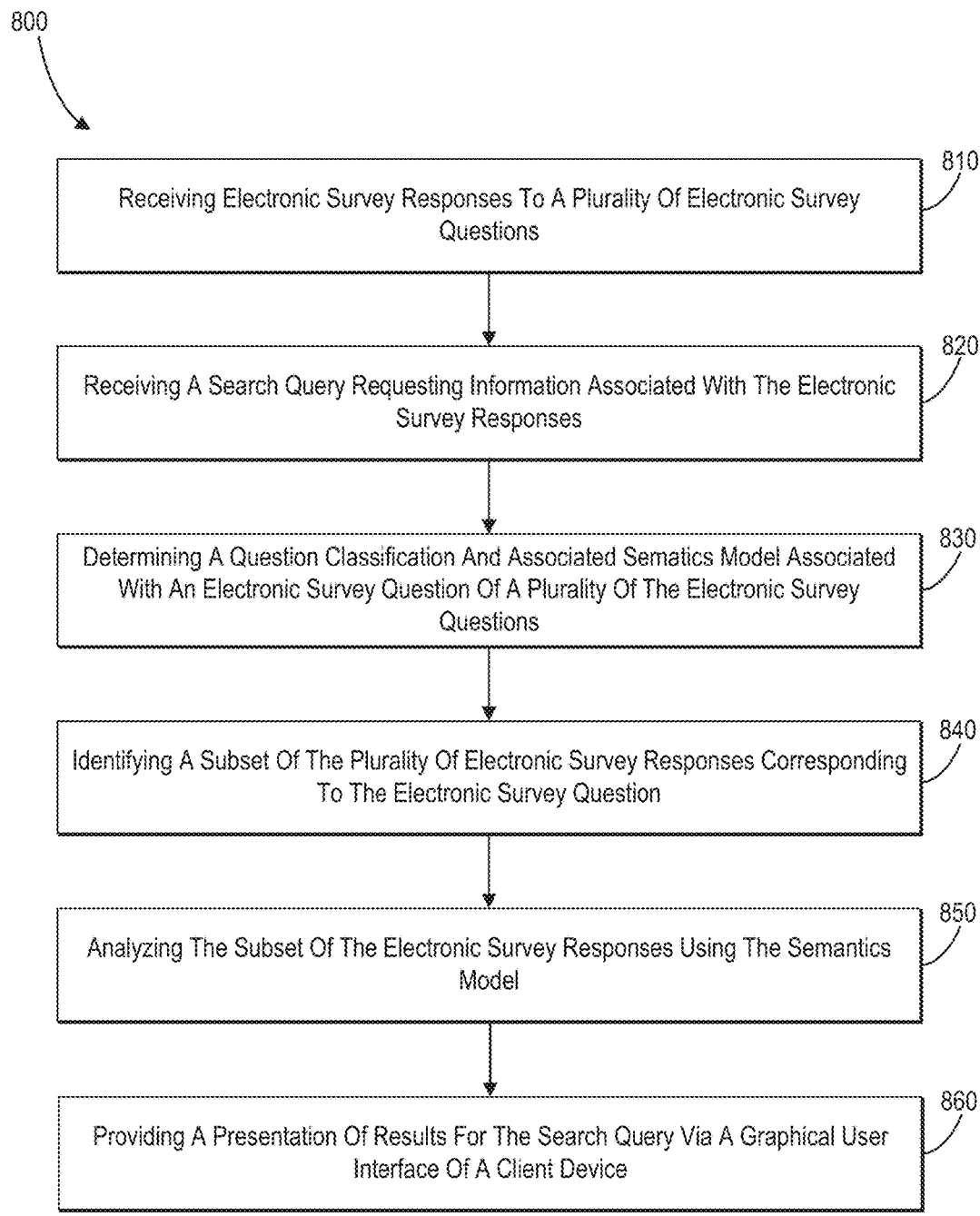
FIG. 8 illustrates a flowchart of a series of acts in a method for collecting and analyzing electronic survey responses to a plurality of electronic survey questions in accordance with one or more embodiments.

FIGS. 7-8 illustrates a flowchart of one example method 700 of analyzing electronic survey responses to one or more electronic survey questions and providing a presentation of analysis results. While FIGS. 7-8 illustrate example steps according to one or more embodiments, other embodiments may omit, add to, reorder, and/or modify any of the steps shown in FIGS. 7-8. Additionally, one or more steps shown in FIGS. 7-8 may be performed by a client device, server device, or combination of components located thereon.

As shown in FIG. 7, a method 700 includes an act 710 of receiving electronic survey responses to an electronic survey question. For example, in one or more embodiments, the act 710 includes receiving, from a plurality of respondent devices 108a-n, a plurality of electronic survey responses to an electronic survey question where the plurality of electronic survey responses including user-composed text. In one or more embodiments, receiving electronic survey responses involves receiving electronic survey responses from any number of electronic survey questions (from one or multiple electronic surveys).

As further shown in FIG. 7, the method 700 includes an act 720 of determining a question classification associated with a semantics model for the electronic survey question. For example, in one or more embodiments, the act 720 includes determining, for the electronic survey question, a question classification associated with a semantics model where the semantics model includes one or more operators for analyzing electronic survey responses to the electronic survey question. In one or more embodiments, the method 700 includes identifying the semantics model associated with the question classification by identifying, from a plurality of pre-defined semantics models, a first pre-defined semantics model associated with a type of the electronic survey question. In one or more embodiments, identifying the question classification includes failing to identify a predefined question classification for the electronic survey question and, in response to failing to identify the predefined question classification for the electronic survey question, the method 700 includes identifying a default question classification associated with a default semantics model comprising multiple operators for analyzing user-composed text.

In one or more embodiments, the method 700 includes generating a semantics model by identifying the one or more operators configured to identify one or more types of information contained within user-composed text. The different types of information can include one or more of opinions, recommendations, questions, or other types of information contained within electronic survey responses. In one or more embodiments, the semantics model includes a predetermined set of the one or more operators corresponding to a type of the electronic survey question. Alternatively, in one or more embodiments, the semantics model includes any number of individually selected operators configured to identify information within user-composed text.

In one or more embodiments, the operators of the semantics model include terminology data including definitions of one or more words or phrases associated with a topic of the electronic survey question. For example, the terminology data can include identified words, phrases, and particular definitions different from conventional meanings for the words or phrases in other contexts. In one or more embodiments, the one or more operators include a plurality of respective operator functions. As an example, in one or more embodiments, an operator includes operator functions where each operator function includes a pattern of words or phrases to search within the user-composed text for each of the plurality of electronic survey responses.

As further shown in FIG. 7, the method 700 includes an act 730 of receiving a search query requesting information associated with the plurality of electronic survey responses. As further shown, the method 700 includes an act 740 of determining that the search query corresponds to the question classification. For example, in one or more embodiments, the act 740 includes determining that the search query corresponds to the question classification for the electronic survey question. In one or more embodiments, the method 700 includes identifying a search classification for the search query and determining that the plurality of electronic survey responses include information relevant to the search query. In one or more embodiments, determining that the plurality of electronic survey responses includes information relevant to the search query by determining that the search classification for the search query matches the question classification for the electronic survey question associated with the plurality of electronic survey responses.

In one or more embodiments, receiving the search query includes receiving, from the client device, a search query including user-composed text. Receiving the search query can also include analyzing the user-composed text of the search query to determine a type of information that the search query is requesting. Receiving the search query can also include determining a search classification for the search query based on the type of information that the search query is requesting.

As an alternative or in addition to receiving a search query including user-composed text, in one or more embodiments, the method 700 detecting, with respect to a graphical user interface of the client device, a user selection of a graphical icon where the graphical icon includes an identification of a topic and one or more associated operators. In addition, the method 700 can include identifying the question classification based on the user selection of the graphical icon.

As further shown in FIG. 7, the method 700 includes an act 750 of analyzing the electronic survey responses using the semantics model. For example, in one or more embodiments, the act 750 includes, based on determining that the search query corresponds to the question classification, analyzing the plurality of electronic survey responses using the one or more operators of the semantics model to determine results for the search query. In one or more embodiments, analyzing the plurality of electronic survey responses includes applying the one or more operators of the semantics model to each of the plurality of electronic survey responses to identify information contained within the user-composed text of the plurality of electronic survey responses.

As further shown in FIG. 7, the method 700 includes an act 760 of providing a presentation of results of the analysis of the electronic survey responses via a graphical user interface of a client device (e.g., the administrator device 112). For example, in one or more embodiments, the act 760 includes providing, via a graphical user interface of a client device, a presentation of results for the search query, the results including information identified within the plurality of electronic survey responses using the one or more operators of the semantics model. In one or more embodiments, the method 700 includes detecting a user input with regard to the graphical user interface of the client device indicating an incorrect meaning associated with a term or phrase by the semantics model. In addition, in one or more embodiments, the method 700 includes modifying the semantics model to include a different meaning for the term or phrase.

In one or more embodiments, the method 700 includes analyzing the plurality of electronic survey response using the one or more operators of the semantics model to determine results for the search query by identifying a subset of the plurality of electronic survey responses including information identified by the one or more operators of the semantics model. In addition, in one or more embodiments, the method 700 includes providing the presentation of results for the search query by providing, within the graphical user interface of the client device, a listing of the subset of the plurality of electronic survey responses.

In one or more embodiments, the method 700 includes analyzing the plurality of electronic survey response using the one or more operators of the semantics model to determine results for the search query by identifying instances of words associated with a topic of the electronic survey question using the one or more operators of the semantics model. In addition, in one or more embodiments, the method 700 includes providing the presentation of results for the search query by providing, via the graphical user interface of the client device, a visualization of the identified instances of words in connection with the topic of the electronic survey question.

In one or more embodiments, the method 700 additionally includes identifying multiple question classifications for a given electronic survey question. For example, in one or more embodiments, the method 700 includes identifying, for the electronic survey question, a second question classification associated with a second semantics model where the second semantics model includes one or more additional operators for analyzing electronic survey responses to the electronic survey question. In addition, in one or more embodiments, the method 700 includes analyzing the plurality of electronic survey responses using the one or more operators of the semantics model and the one or more additional operators of the second semantics model to identify information within the plurality of responses to the electronic survey. In one or more embodiments, the method 700 further includes identifying the question classification and the second question classification based on determining that the electronic survey question includes a request for multiple types of information corresponding to the question classification and the second question classification.

FIG. 8 illustrates another method 800 for analyzing electronic survey responses to one or more electronic survey questions and providing a presentation of analysis results. For example, as shown in FIG. 8, the method 800 includes an act 810 of receiving electronic survey responses to a plurality of electronic survey questions. In one or more embodiments, the act 810 includes receiving, from a plurality of respondent devices 108a-n, a plurality of electronic survey responses to a plurality of electronic survey questions where the plurality of electronic survey responses include user-composed text.

As further shown in FIG. 8, the method 800 includes an act 820 of receiving a search query requesting information associated with the electronic survey responses. As also shown, the method 800 includes an act 830 of determining a question classification and associated semantics model associated with an electronic survey question of the plurality of electronic survey questions. In one or more embodiments, the act 830 includes determining, based on the search query, a question classification associated with an electronic survey question of the plurality of electronic survey questions where the question classification is associated with a semantics model including one or more operators for analyzing electronic survey responses received in response to the electronic survey question. In one or more embodiments, determining the question classification based on the search query includes identifying one or more electronic survey questions of the plurality of electronic survey questions including a request for a similar type of information as a type of information requested by the search query.

As shown in FIG. 8, the method 800 includes an act 840 of identifying a subset of the plurality of electronic survey responses corresponding to the electronic survey question. For example, in one or more embodiments, the act 840 includes identifying a subset of the plurality of electronic survey responses corresponding to the electronic survey question associated with the question classification.

FIG. 8 also shows that the method 800 includes an act 850 of analyzing the subset of the electronic survey responses using the semantics model. For example, in one or more embodiments, the act 850 includes analyzing the subset of the plurality of electronic survey responses using the one or more operators of the semantics model to determine results for the search query.

As shown in FIG. 8, the method 800 includes an act 860 of providing a presentation of results for the search query via a graphical user interface of a client device. For example, in one or more embodiments, the act 860 includes providing, via a graphical user interface of a client device, a presentation of results for the search query where the results include information identified within the subset of the plurality of electronic survey responses using the one or more operators of the semantics model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
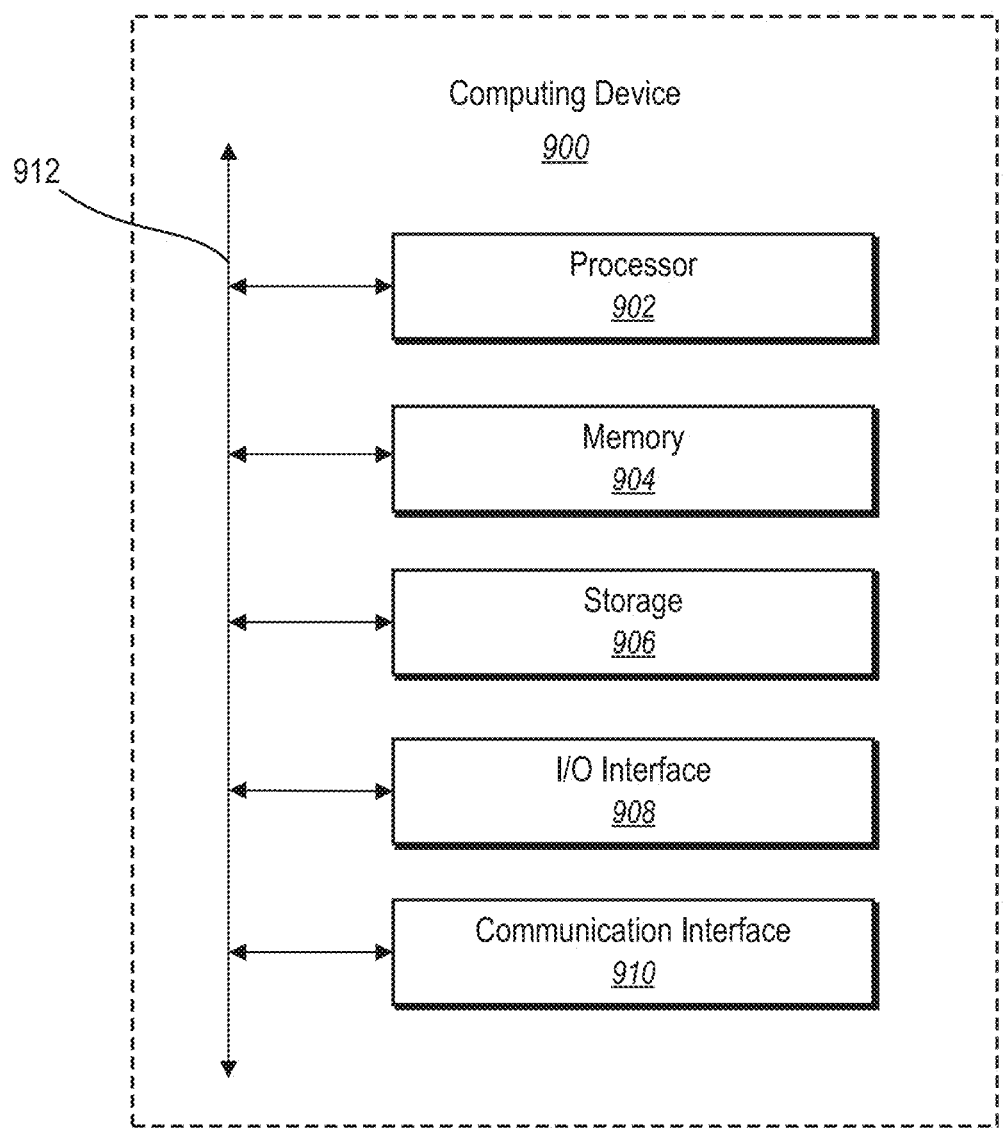
FIG. 9 illustrates a block diagram of a computing device in accordance with one or more embodiments.

FIG. 9 illustrates a block diagram of exemplary computing device 900 that may be configured to perform one or more of the processes described above. One will appreciate that one or more computing devices such as the computing device 900 may be implemented by the server device(s) 102 and/or other devices described above in connection with FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
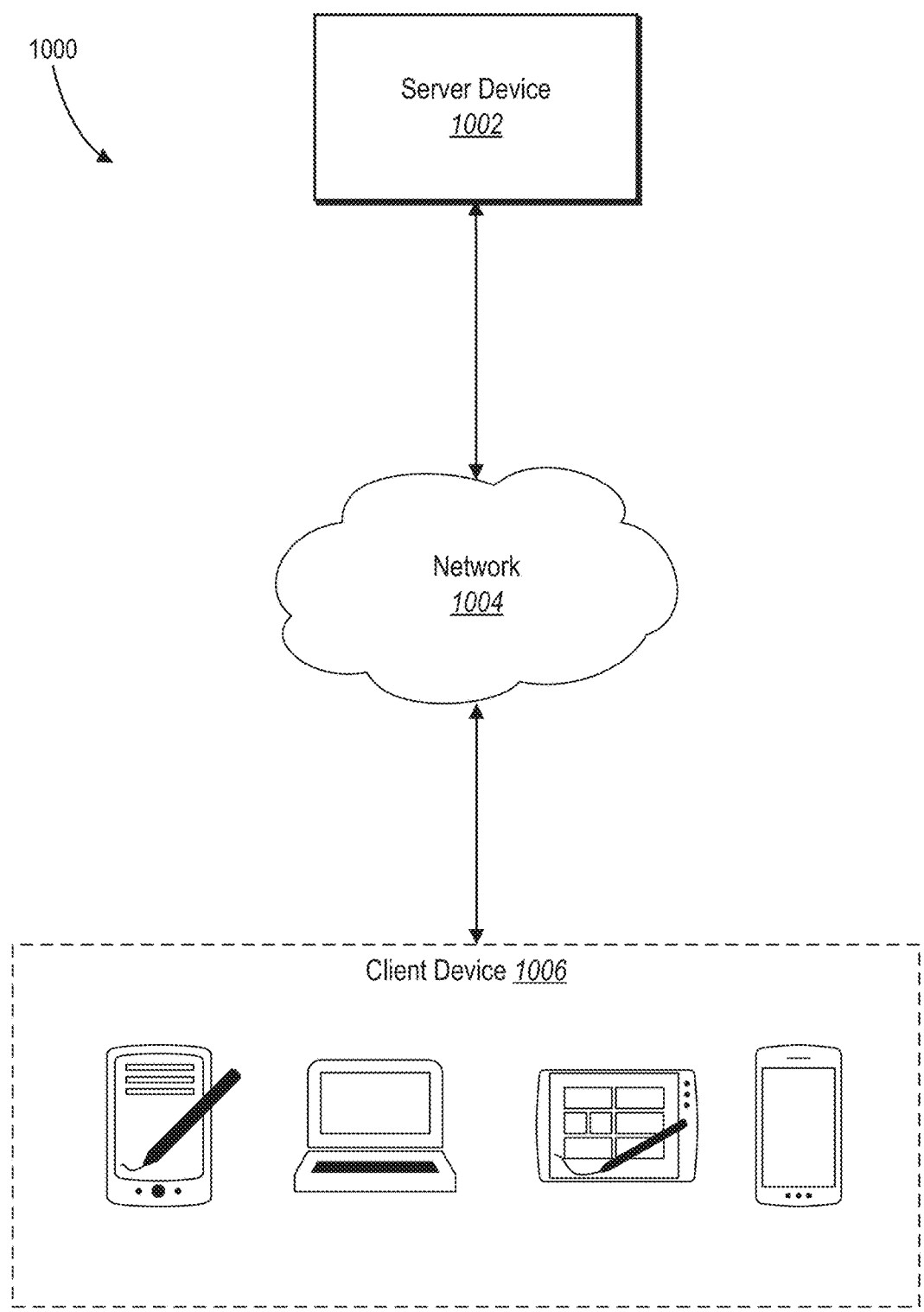
FIG. 10 illustrates a networking environment of an electronic survey system in accordance with one or more embodiments.

FIG. 10 illustrates an example network environment 1000 of a survey network 100. Network environment 1000 includes a client device 1006, and a server device 1002 connected to each other by a network 1004. Although FIG. 10 illustrates a particular arrangement of client system 1006, server device 1002, and network 1004, this disclosure contemplates any suitable arrangement of client device 1006, server device 1002, and network 1004. As an example and not by way of limitation, two or more of client device 1006, and server device 1002 may be connected to each other directly, bypassing network 1004. As another example, two or more of client device 1006 and server device 1002 may be physically or logically co-located with each other in whole, or in part. Moreover, although FIG. 10 illustrates a particular number of client devices 1006, server device(s) 1002, and networks 1004, this disclosure contemplates any suitable number of client devices 1006, server device(s) 1002, and networks 1004. As an example and not by way of limitation, network environment 1000 may include multiple client devices 1006, survey device(s) 1002, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client device 1006, and server device 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include any of the computing devices discussed above in relation to one or more embodiments described herein. A client device 1006 may enable a network user at client device 1006 to access network 1004. A client device 1006 may enable its user to communicate with other users at other client systems.

In particular embodiments, client device 1006 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1006 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1002 may include a variety of servers, sub-systems, programs, modules, logs, and data stores. In particular embodiments, server device 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 may also include suitable components such as network interfaces, security mechanisms, load balancers, failover servers, management-and-network-operations consoles, other suitable components, or any suitable combination thereof.

In particular embodiments, server device 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
receiving, from a plurality of respondent devices, a plurality of electronic survey responses to an electronic survey question, the plurality of electronic survey responses comprising user-composed text;
determining, for the electronic survey question, a question classification associated with a semantics model, the semantics model comprising one or more operators for analyzing electronic survey responses to the electronic survey question;
receiving a search query requesting information associated with the plurality of electronic survey responses;

determining that the search query corresponds to the question classification for the electronic survey question;

based on determining that the search query corresponds to the question classification, analyzing the plurality of electronic survey responses using the one or more operators of the semantics model to determine results for the search query; and providing, via a graphical user interface of a client device, a presentation of the results for the search query, the results comprising information identified within the plurality of electronic survey responses using the one or more operators of the semantics model.

2. The method of claim 1, further comprising generating the semantics model by identifying the one or more operators, wherein the one or more operators are configured to identify one or more types of information contained within user-composed text.

3. The method of claim 2, wherein the one or more types of information comprise one or more of: opinions, recommendations, or questions.

4. The method of claim 1, wherein the semantics model comprises a predetermined set of the one or more operators corresponding to a type of the electronic survey question.

5. The method of claim 1, wherein determining the question classification comprises:

failing to identify a predefined question classification for the electronic survey question; and in response to failing to identify the predefined question classification for the electronic survey question, identifying a default question classification associated with a default semantics model comprising multiple operators for analyzing user-composed text.

6. The method of claim 1, further comprising identifying the semantics model associated with the question classification by identifying, from a plurality of pre-defined semantics models, a first pre-defined semantics model associated with a type of the electronic survey question.

7. The method of claim 1, wherein the semantics model further comprises terminology data comprising definitions of one or more words or phrases associated with a topic of the electronic survey question.

8. The method of claim 1, wherein at least one of the one or more operators comprises a plurality of operator functions, each of the operator functions comprising a pattern of words or phrases to search within user-composed text in one or more electronic survey responses of the plurality of electronic survey responses.

9. The method of claim 1, further comprising:

identifying a search classification for the search query; and determining that the plurality of electronic survey responses include information relevant to the search query by determining that the search classification for the search query matches the question classification for the electronic survey question.

10. The method of claim 1, further comprising:

identifying, for the electronic survey question, a second question classification associated with a second semantics model, the second semantics model comprising one or more additional operators for analyzing electronic survey responses to the electronic survey question; and analyzing the plurality of electronic survey responses using the one or more operators of the semantics model and the one or more additional operators of the second semantics model to identify information within the plurality of electronic survey responses to the electronic survey question.

11. The method of claim 10, further comprising identifying the question classification and the second question classification based on determining that the electronic survey question comprises a request for multiple types of information corresponding to the question classification and the second question classification.

12. The method of claim 1, wherein receiving the search query comprises:

receiving, from the client device, a search query comprising user-composed text;

analyzing the user-composed text of the search query to determine a type of information that the search query is requesting; and determining a search classification for the search query based on the type of information that the search query is requesting.

13. The method of claim 1, further comprising:

detecting, with respect to the graphical user interface of the client device, a user selection of a graphical icon, the graphical icon comprising an identification of a topic and one or more associated operators; and identifying the question classification based on the user selection of the graphical icon.

14. The method of claim 1, wherein analyzing the plurality of electronic survey responses comprises applying the one or more operators of the semantics model to each of the plurality of electronic survey responses to identify information contained within the user-composed text of the plurality of electronic survey responses.

15. The method of claim 1, further comprising:

detecting a user input with regard to the graphical user interface of the client device indicating an incorrect meaning associated with a term or phrase by the semantics model; and modifying the semantics model to include a different meaning for the term or phrase.

16. The method of claim 1, wherein:

analyzing the plurality of electronic survey responses using the one or more operators of the semantics model to determine results for the search query comprises identifying a subset of the plurality of electronic survey responses including information identified by the one or more operators of the semantics model; and providing the presentation of results for the search query comprises providing, within the graphical user interface of the client device, a listing of the subset of the plurality of electronic survey responses.

17. The method of claim 1, wherein:

analyzing the plurality of electronic survey responses using the one or more operators of the semantics model to determine results for the search query comprises identifying instances of words associated with a topic of the electronic survey question using the one or more operators of the semantics model; and providing the presentation of results for the search query comprises providing, via the graphical user interface of the client device, a visualization of the identified instances of words in connection with the topic of the electronic survey question.

18. A non-transitory computer readable storage medium storing instructions thereon that, when executed by the at least one processor, cause a computer system to:

receive a search query requesting information associated with a plurality of electronic survey responses to a plurality of electronic survey questions, the plurality of electronic survey responses comprising user-composed text;

determine, based on the search query, a question classification associated with an electronic survey question of the plurality of electronic survey questions, wherein the question classification is associated with a semantics model comprising one or more operators for analyzing electronic survey responses received in response to the electronic survey question of the plurality of electronic survey questions;

analyze a subset of the plurality of electronic survey responses using the one or more operators of the semantics model to determine results for the search query; and provide, via a graphical user interface of a client device, a presentation of the results for the search query, the results comprising information identified within the subset of the plurality of electronic survey responses using the one or more operators of the semantics model.

19. The computer-readable storage medium of claim 18, wherein determining the question classification based on the search query comprises identifying one or more electronic survey questions from the plurality of electronic survey questions comprising a request for a similar type of information as a type of information requested by the search query.

20. A system comprising:
at least one processor; and
a non-transitory computer readable storage medium storing instructions thereon that, when executed by the at least one processor, cause the system to:

receive, from a plurality of respondent devices, a plurality of electronic survey responses to an electronic survey question, the plurality of electronic survey responses comprising user-composed text;

determine, for the electronic survey question, a question classification associated with a semantics model, the semantics model comprising one or more operators for analyzing electronic survey responses to the electronic survey question;

receive a search query requesting information associated with the plurality of responses;

determine that the search query corresponds to the question classification for the electronic survey question;

based on determining that the search query corresponds to the question classification, analyze the plurality of electronic survey responses using the one or more operators of the semantics model to determine results for the search query; and provide, via a graphical user interface of a client device, a presentation of the results for the search query, the results comprising information identified within the plurality of electronic survey responses using the one or more operators of the semantics model.

* * * * *